US010566875B2

(12) United States Patent
Camilleri

(10) Patent No.: US 10,566,875 B2
(45) Date of Patent: Feb. 18, 2020

(54) HYDROKINETIC POWER GENERATOR

(71) Applicant: Kinetic NRG Technologies Pty Ltd., Red Hill (AU)

(72) Inventor: Paul Anthony Camilleri, Red Hill (AU)

(73) Assignee: Kinetic NRG Technologies Pty Ltd, Queensland (AU)

(*) Notice: Subject to any disclaimer, the term of this patent is extended or adjusted under 35 U.S.C. 154(b) by 0 days.

(21) Appl. No.: 16/461,593

(22) PCT Filed: Dec. 8, 2017

(86) PCT No.: PCT/AU2017/051360
§ 371 (c)(1),
(2) Date: May 16, 2019

(87) PCT Pub. No.: WO2018/102886
PCT Pub. Date: Jun. 14, 2018

(65) Prior Publication Data
US 2019/0372430 A1    Dec. 5, 2019

(30) Foreign Application Priority Data

Dec. 9, 2016  (AU) .............................. 2016905107
Jan. 17, 2017 (AU) .............................. 2017900132

(51) Int. Cl.
*F03B 13/26* (2006.01)
*F03B 17/06* (2006.01)
(Continued)

(52) U.S. Cl.
CPC .............. *H02K 7/18* (2013.01); *F03B 13/264* (2013.01); *F03B 17/061* (2013.01);
(Continued)

(58) Field of Classification Search
CPC ............ F03B 17/061; F05B 2220/7068; F05B 2240/13; F05B 240/14; F05B 2240/32; F05B 2240/93; F05B 2250/15; F05B 2250/25; F05B 2250/311; F05B 2250/33; F05B 2260/4021
See application file for complete search history.

(56) References Cited

U.S. PATENT DOCUMENTS 1,100,332 A * 6/1914 Smith ................... F04D 29/281
416/175
1,461,502 A * 7/1923 Solinger ............... F03B 17/061
416/123
(Continued)

FOREIGN PATENT DOCUMENTS

DE    202013103528 U1 * 11/2014 ............... F03D 1/02
WO    WO-2016019466 A1 *  2/2016 ............. F03D 17/00
WO    WO-2018102886 A1 *  6/2018 ............ F03B 13/264

*Primary Examiner* — Benjamin F Fiorello
(74) *Attorney, Agent, or Firm* — Reches Patents

(57) ABSTRACT

A hydrokinetic generator including: a submersible housing defining a conduit therethrough for the flow of a fluid; a turbine mounted to the housing comprising at least one impeller located in the conduit for rotation by said flow; and at least one electrical generator coupled to the at least one turbine for converting mechanical energy from the turbine to electrical energy, the electrical generator including a plurality of elongate members bearing one or more magnetic regions, the elongate members being disposed about the at least one impeller and fast therewith; and a number of windings located within material of the housing and arranged for electromagnetic interaction with said magnetic regions whereby in use rotation of the impeller moves the magnetic regions past the windings to thereby induce an electrical current in the windings. The impeller may comprise a plurality of spiral, helical blades disposed about a common axle from a leading end thereof to a trailing end wherein a radius of the blades increases exponentially from the leading end to the trailing end.

13 Claims, 22 Drawing Sheets

(51) Int. Cl.
*F03B 3/04* (2006.01)
*F03B 3/12* (2006.01)
*H02K 7/18* (2006.01)

(52) U.S. Cl.
CPC ... *F05B 2220/7068* (2013.01); *F05B 2240/13* (2013.01); *F05B 2240/14* (2013.01); *F05B 2240/32* (2013.01); *F05B 2240/93* (2013.01); *F05B 2250/15* (2013.01); *F05B 2250/25* (2013.01); *F05B 2250/311* (2013.01); *F05B 2250/33* (2013.01); *F05B 2260/4021* (2013.01)

(56) References Cited

U.S. PATENT DOCUMENTS

| | | | | |
|---|---|---|---|---|
| 5,425,617 A * | 6/1995 | Teran | ............... | B63H 5/16 415/71 |
| 5,760,515 A * | 6/1998 | Burns | ............... | F03D 9/00 310/115 |
| 7,344,353 B2 * | 3/2008 | Naskali | ............... | F03D 3/061 415/4.2 |
| 7,573,148 B2 * | 8/2009 | Nica | ............... | F03D 3/0409 290/55 |
| 8,506,244 B2 * | 8/2013 | McBride | ............... | F03B 3/02 415/204 |
| 8,814,493 B1 * | 8/2014 | Komp | ............... | F03D 1/04 415/1 |
| 9,328,713 B2 * | 5/2016 | Beaston | ............... | F03B 3/14 |
| 9,759,179 B2 * | 9/2017 | Culpepper | ............... | F03B 3/126 |
| 2007/0241566 A1 * | 10/2007 | Kuehnle | ............... | F03B 17/061 290/53 |
| 2010/0327591 A1 * | 12/2010 | Dick | ............... | F03B 17/061 290/52 |
| 2014/0017065 A1 * | 1/2014 | Dale | ............... | F03B 3/04 415/68 |
| 2014/0054898 A1 * | 2/2014 | Urch | ............... | F03B 17/061 290/55 |

* cited by examiner

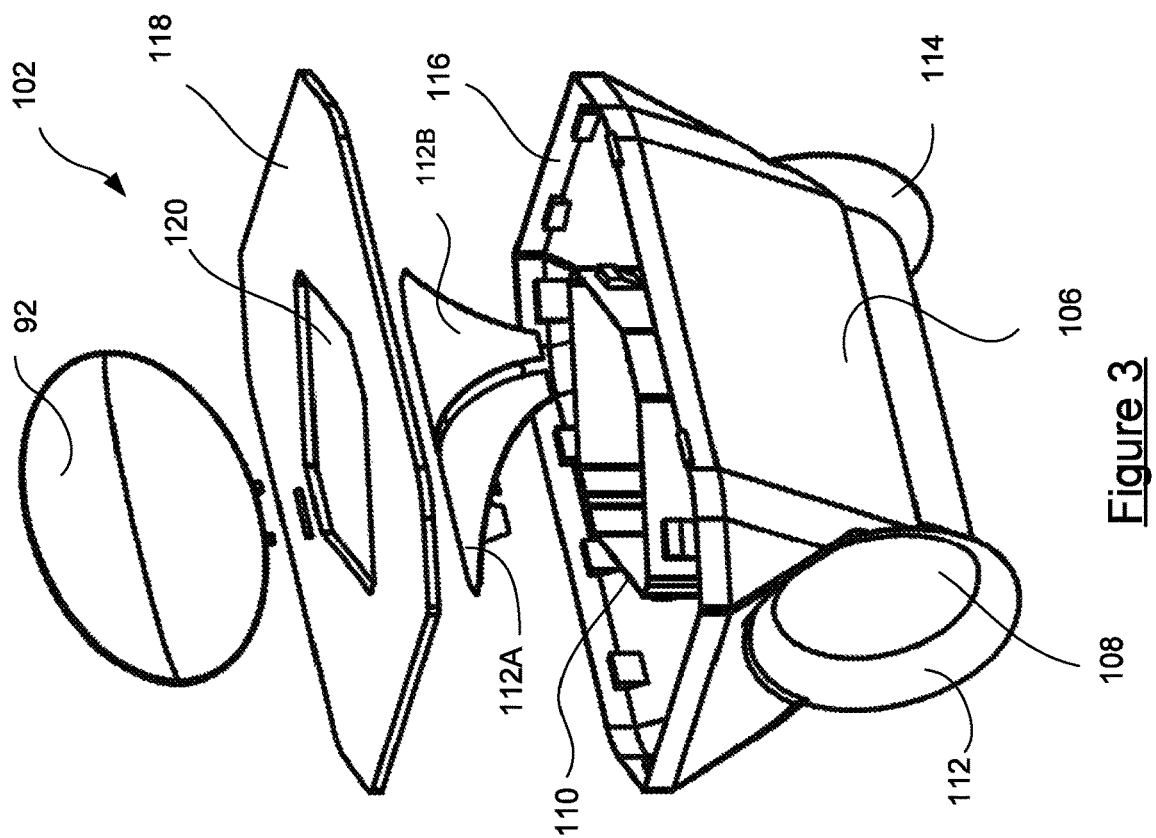
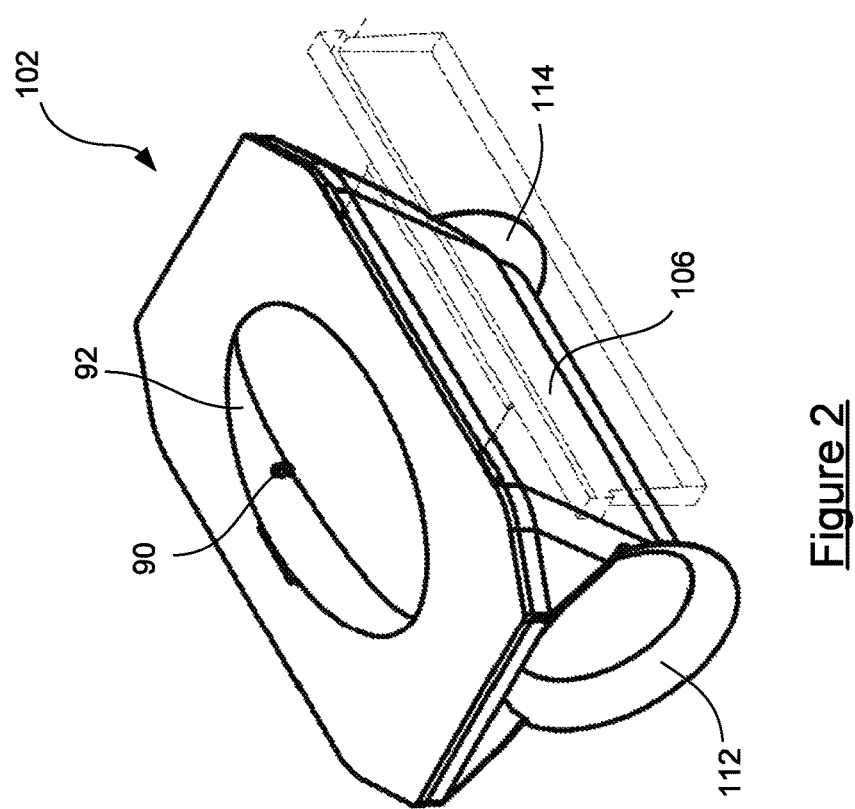
Figure 3
Figure 2

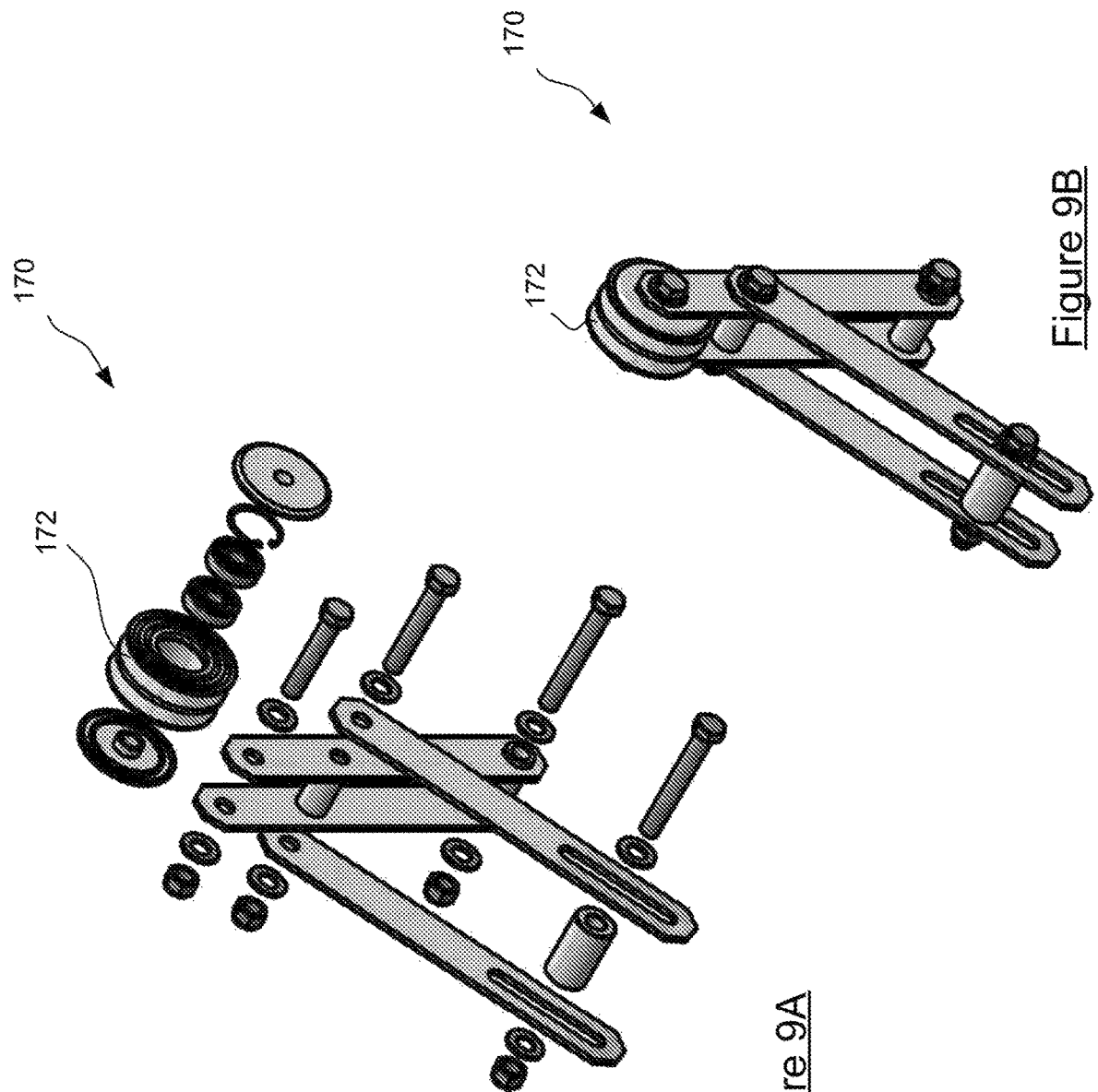

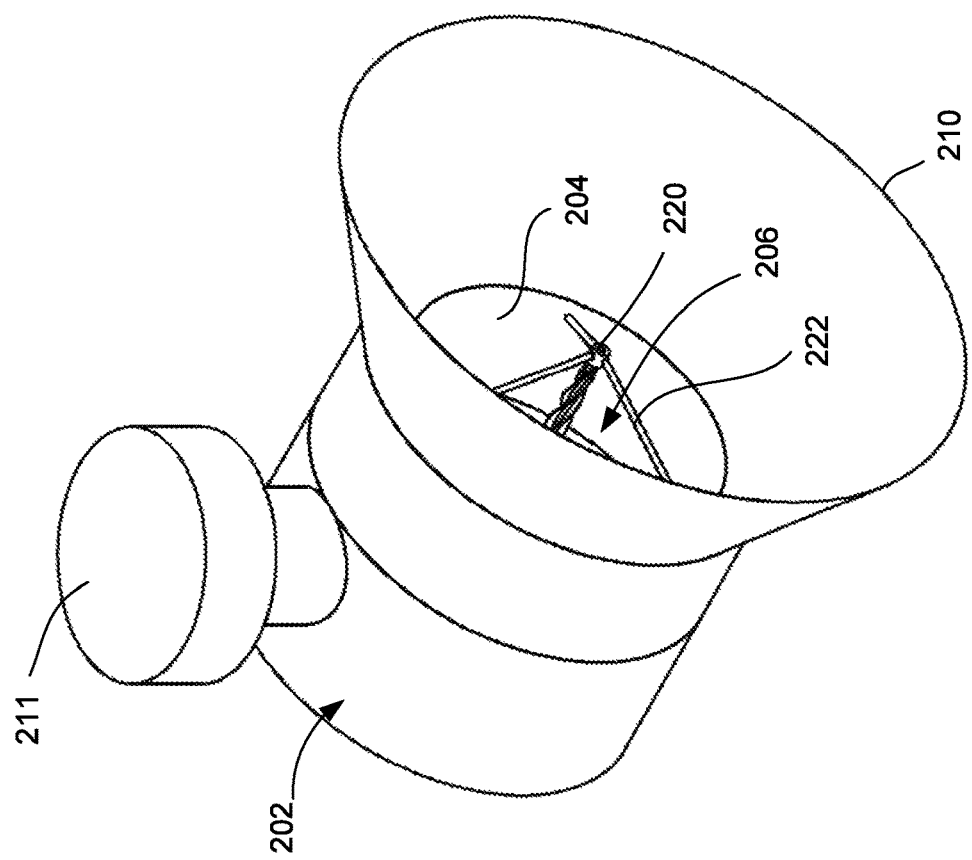
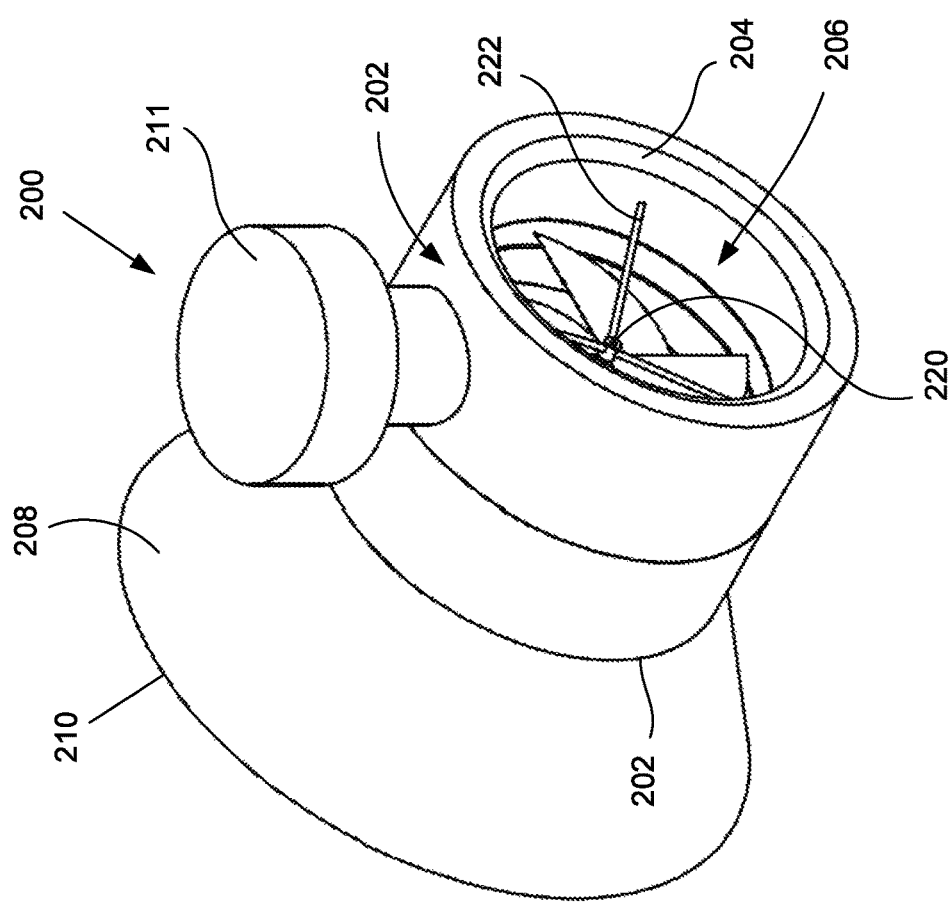

HYDROKINETIC POWER GENERATOR

TECHNICAL FIELD

The present invention is directed to an apparatus to extract energy in the form of electricity from fluid flows such as open conduits for example creeks, rivers and ocean currents and also in some circumstances from tidal flows.

BACKGROUND

Any references to methods, apparatus or documents of the prior art are not to be taken as constituting any evidence or admission that they formed, or form part of the common general knowledge.

A body of water has two types of energy that can be harnessed to generate electricity: hydrostatic and hydrokinetic. Hydrostatic is the potential energy of a water body due to its height with respect to a reference ground. Conventional hydropower plants use dams and reservoirs to store water with a large amount of hydrostatic energy in order to harness the energy in a controllable manner to generate electricity.

Hydrokinetic energy is the kinetic energy of a water mass due to its movement. The faster the water velocity, the larger hydrokinetic energy it contains. There are two types of hydrokinetic energy current-based and wave-based hydrokinetic energy. Current-based hydrokinetic energy can be found in river streams, artificial waterways, irrigation canals, tidal and ocean currents.

An advantage of extracting hydrokinetic energy is that it is not necessary to build dams or reservoirs. The energy is extracted from the natural flow of water along the river stream, irrigation canal etc.

It is an object of the invention to provide a hydrokinetic generator for harvesting power from fluid flow that is an improvement over hitherto known generators.

SUMMARY OF THE INVENTION

According to a first aspect of the present invention there is provided an impeller for a hydrokinetic turbine comprising a plurality of spiral, helical blades disposed about a common axle from a leading end thereof to a trailing end wherein the blades' radii increases from the leading end to the trailing end.

Preferably the blades' radii increases exponentially from the leading end to the trailing end.

In one embodiment ribs are disposed over the blades to assist in capturing energy from fluid flowing across the impeller in use.

The ribs may comprise one or more radial ribs and one or more spiral ribs.

Alternatively, the surface of the ribs may be roughened to assist in capturing energy from fluid flowing across the impeller in use.

At least one impeller of the type discussed above may form part of a hydrokinetic generator including:
 a submersible housing defining a conduit therethrough for the flow of a fluid;
 a turbine mounted to the housing comprising at least one of the impellers located in the conduit for rotation by said flow; and
 at least one electrical generator coupled to the at least one turbine for converting mechanical energy from the turbine to electrical energy.

Preferably the turbine comprises first and second impellers each having a leading end and a trailing end, the impellers being mounted coaxially with trailing ends adjacent to each other for accommodating bidirectional flows through the conduit.

The hydrokinetic generator may include a plurality of elongate members bearing one or more magnetic regions, the elongate members being disposed about the at least one impeller and fast therewith; and
 a number of windings arranged for electromagnetic interaction with said magnetic regions whereby in use rotation of the impeller moves the magnetic regions past the windings to thereby induce an electrical current in the windings.

Preferably an impeller ring is disposed about outermost tips of the impeller and fastened thereto wherein the impeller ring and the impeller are coaxial.

Preferably the elongate members bearing said magnetic regions extend from the impeller ring in parallel with the axis of the impeller.

The hydrokinetic generator preferably includes leading and trailing rings, wherein leading tips of the elongate members are fastened to the leading ring and trailing tips of the elongate members are fastened to the trailing ring.

Preferably a wall defining the conduit is formed with an annular recess for receiving a periphery of the impeller ring.

Leading and trailing cylindrical openings may be formed in the wall which are continuous with the annular recess and extend laterally therefrom for accommodating the elongate members and the leading ring and trailing ring.

Preferably the windings are located within the wall.

In a preferred embodiment of the present invention the windings are located on opposed sides of the leading and trailing cylindrical openings.

The windings are preferably sealed within material of the wall in order that they are isolated from contact with fluid flowing through the conduit in use.

Preferably cables are connected to the windings and impregnated within the housing and extend therethrough to a connection terminal.

In a preferred embodiment of the invention each of the windings has a ferromagnetic core.

In a further embodiment of the invention there is provided a hydrokinetic generator wherein each impeller is mounted to an impeller frame.

A drive wheel may be pivotally connected between the impeller frames and rotationally fixed to the axle of each impeller.

Preferably the electrical generator is mounted above the impeller frames.

In the further embodiment of the invention the electrical generator is mounted to a generator frame that is fastened to each of the impeller frames.

The electrical generator may include a rotor that is coupled to a sheave for rotation thereby.

The drive wheel may be coupled to the sheave by one or more belts.

In the further embodiment of the invention the rotor of the generator is coupled to the sheave via a clutch that is arranged to disengage in response to the sheave being rotated above a predetermined rate.

The housing may form part of a pontoon that is formed with a hull having the conduit therethrough in which the turbine is located.

One or more cowls may be provided between the turbine and the electrical generator to reduce fluid contact with the generator.

In the further embodiment of the invention the pontoon includes a shroud that is mounted about an upper edge of the hull.

According to a further aspect of the present invention there is provided a hydrokinetic generator including:
- a submersible housing defining a conduit therethrough for the flow of a fluid;
- a turbine mounted to the housing comprising at least one impeller located in the conduit for rotation by said flow; and
- at least one electrical generator coupled to the at least one turbine for converting mechanical energy from the turbine to electrical energy, the electrical generator including a plurality of elongate members bearing one or more magnetic regions, the elongate members being disposed about the at least one impeller and fast therewith; and
- a number of windings located within material of the housing and arranged for electromagnetic interaction with said magnetic regions whereby in use rotation of the impeller moves the magnetic regions past the windings to thereby induce an electrical current in the windings.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 2 is an assembled view of a pontoon of the hydrokinetic generator of FIG. 1.

FIG. 3 is an exploded view of the pontoon of FIG. 2.

FIG. 9A is an exploded view of a belt tensioner of the turbine and electrical generator assembly.

FIG. 9B is an assembled view of the belt tensioner of FIG. 9.

FIG. 10A is an isometric view of a trailing side of a hydrokinetic generator according to a preferred embodiment of the present invention.

FIG. 10B is an isometric view of a leading side of the hydrokinetic generator of FIG. 10.

DETAILED DESCRIPTION OF PREFERRED EMBODIMENTS

Figure 1:
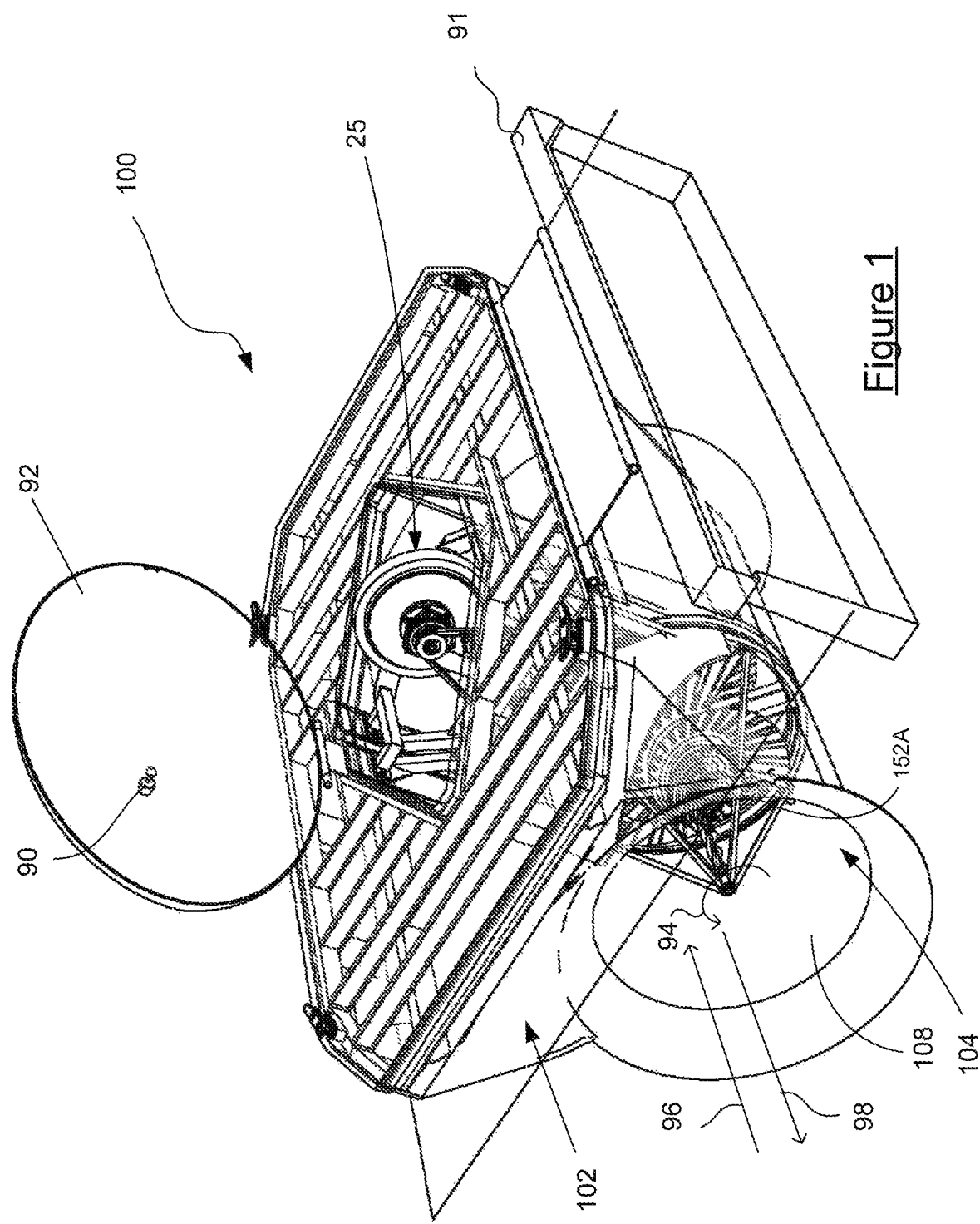
FIG. 1 depicts a partially cutaway view of a hydrokinetic generator according to an embodiment of the present invention.
Figure 4:
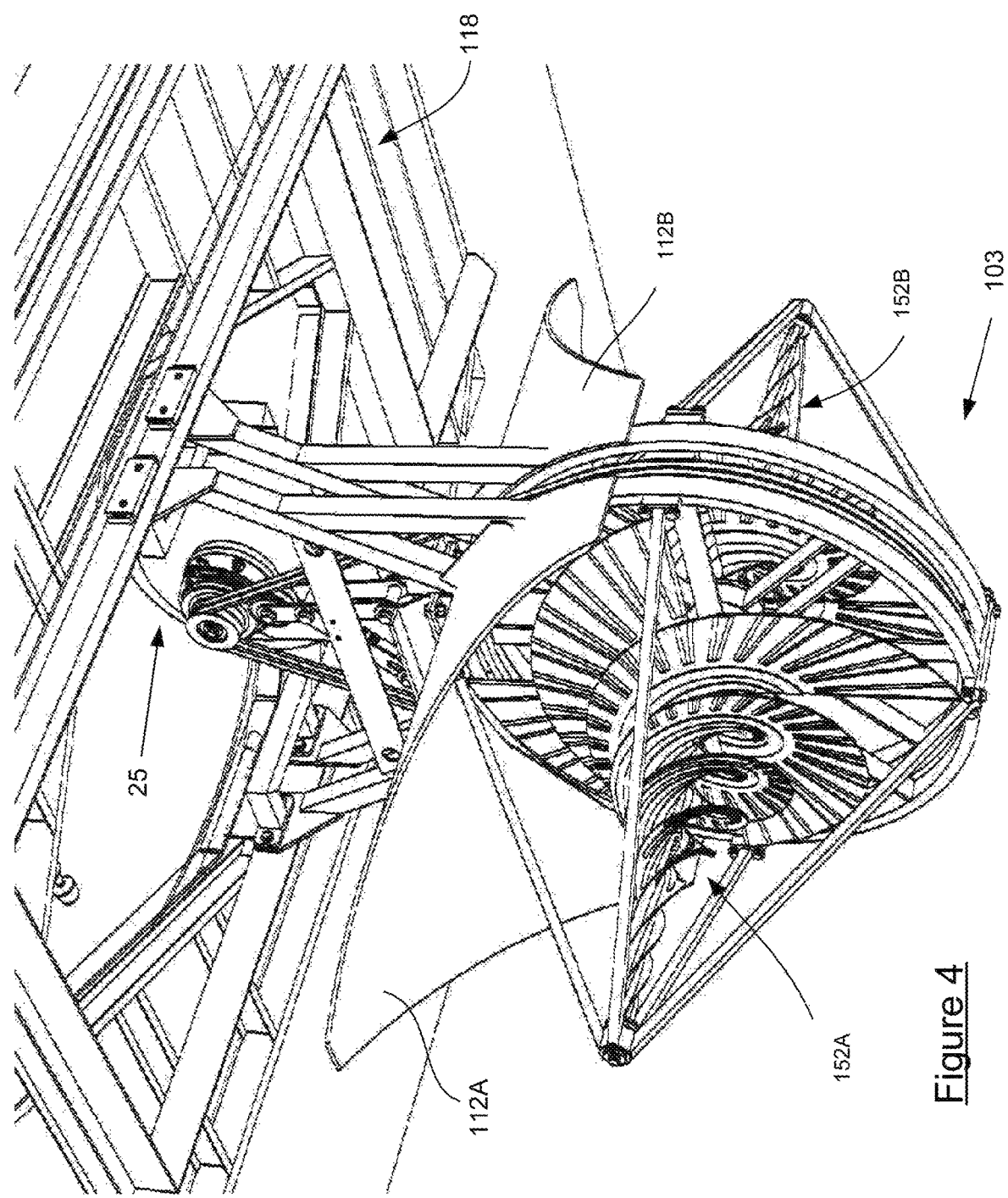
FIG. 4 is a partially cutaway view of the underside of the hydrokinetic generator of FIG. 1.

FIG. 1 depicts a floating hydrokinetic generator 100 according to a first embodiment of the present invention. FIG. 4 is a partially cutaway view of an underside of the generator 100. Broadly speaking the hydrokinetic generator 100 is comprised of a pontoon 102 in which there is mounted a bidirectional turbine 103 (indicated in FIG. 4) and an electrical generator 25. FIG. 2 is an isometric view of the pontoon 102 in an assembled state whereas FIG. 3 shows the pontoon 102 in an exploded view.

With reference to FIGS. 2 and 3 the pontoon 102 includes hull 106 through which there is formed a tunnel 108. The tunnel 108 intersects with a generator mounting opening 110. At either end of the tunnel 108 there are provided conical section inlet ports 112 and 114. The upper edge of the hull 106 is fitted to a peripheral pontoon shroud 116. The pontoon shroud 116 receives a deck 118. Deck 118 is formed with a central opening 120 that corresponds to and fits about the upper end of the generator mounting opening 110. A hinged cover 92 is provided to cover the generator mounting opening 110 and so prevent ingress of water therein during use. An indicator light 90 is mounted atop the cover 92. The indicator light may act as a beacon to assist in locating the pontoon at night or alternatively it may be wired to only operate while the hydrokinetic generator 100 is producing energy so that the status of the generator may be readily ascertained from a distance.

Turbine cowls 112A, 112B are also provided as part of the pontoon 102. Referring now to FIG. 4, there is provided a view of the underside of the deck 118 with the turbine and generator assembly 104 fitted thereto. In this view the cowls 112A, 112B can be seen in their installed position wherein they separate submerged impellers 152A, 152B of the assembly 104 from an upper, non-submerged electrical generator 25. Accordingly, they assist in constraining fluid flow through the tunnel 108.

Figure 5:
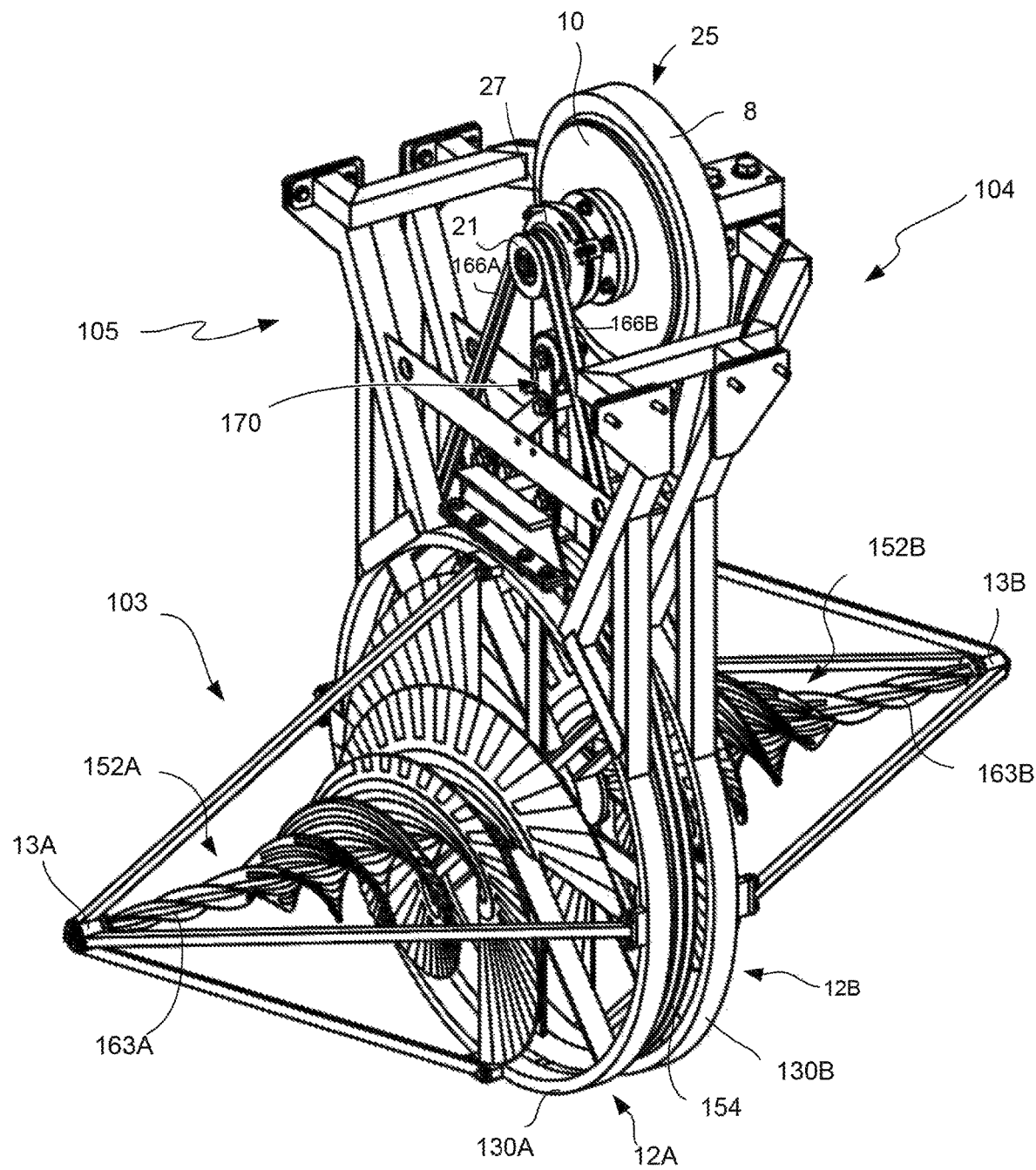
FIG. 5 is a view of a turbine and electrical generator assembly of the hydrokinetic generator of FIG. 1.

Referring now to FIG. 5 there is shown a detailed view of the turbine and electrical generator assembly 104. FIGS. 6 to 10 depict various components of the assembly 104 which will now be described.

Figure 7:
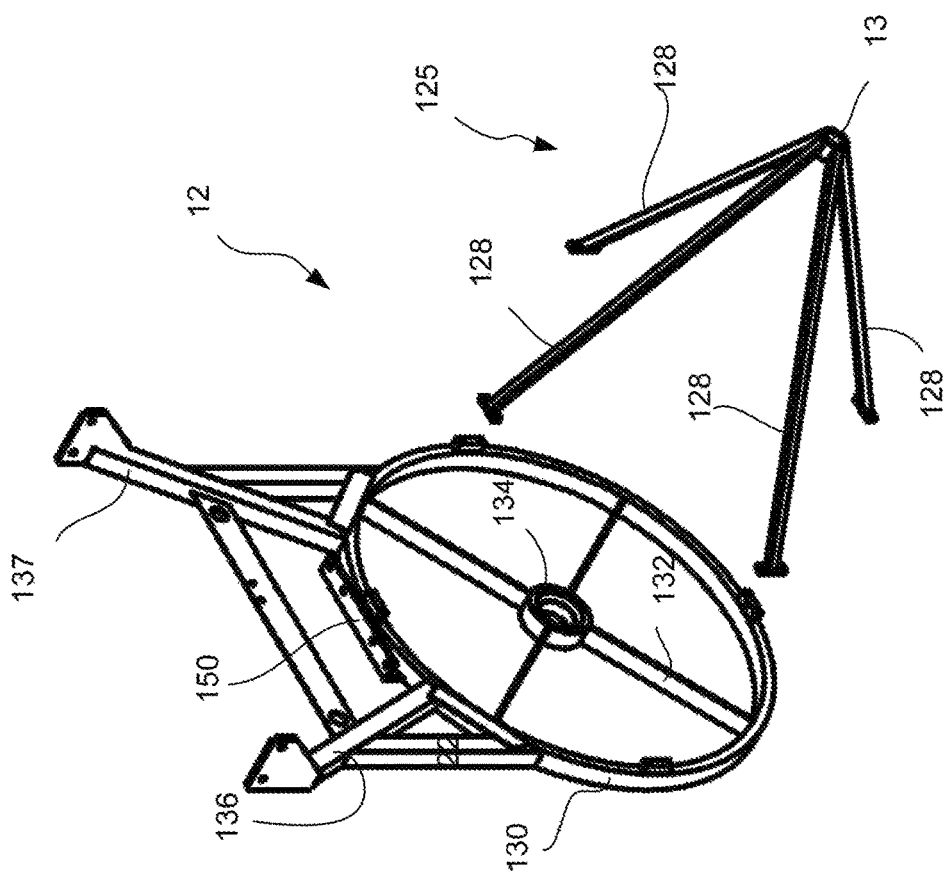
FIG. 7 is a view of a generator frame of the turbine and electrical generator assembly.

The turbine and electrical generator assembly 104 includes a generator frame 105, best seen in FIG. 7, to which (as shown in FIG. 5) there is fixed the outer housing 8 of an electrical generator 25. The generator 25 has a rotor 10 that is coaxially coupled to a sheave 21 via an electric clutch 27. Rotation of the sheave 21 whilst the clutch 27 is engaged, i.e. during normal operation, causes rotation of the rotor 10 of the generator 25 and thus generation of electrical current. The clutch 27 is responsive to electrical output from the generator 25 so that it mechanically disengages the sheave from the rotor if the electrical generator output exceeds a predetermined level, as might occur when faster than expected water flow occurs through the tunnel 108.

The generator frame 105 is mounted to back-to-back turbine housing frames 12A and 12B. A rotatable drive wheel 154 is concentrically mounted between hubs of the frames 12A and 12B. As will be discussed further, each of the frames captures one of two opposed, back to back impellers 152A, 152B which are rotatable relative to the frames but fixed rotationally relative to the drive wheel 154. Belts 166A and 166B are looped over the sheave 21 and the drive wheel 154 so that rotation of the impellers in response to the flow of water causes rotation of the sheave 21 and thence production of electricity by the generator 25.

The Inventor has conceived that the back to back impellers, (i.e. impellers 152A, 152B) are advantageous where hydrokinetic generators are to be installed in an area of tidal flow such as an estuary or other opening into the sea where over time the flow of water will be bidirectional. The back to back impellers allow for the harvesting energy from the fluid flowing in either of two opposed directions. An alternative approach would be to have a hydrokinetic generator that is arranged for the turbines to be pivoted relative to a support platform from a first position for harvesting energy from water flowing in a first direction to a second position for harvesting water flowing in a second direction. However it will be realised that such an arrangement would involve the addition of a heavy pivoting assembly which would be prone to wear and which would require continuous periodic operation in a title zone.

Another approach to addressing the problem of providing a hydrokinetic generator for use fluid flow area would be to provide a floating platform that may be readily rotated through 180°. However there are issues associated with the anchoring of a platform that must be frequently rotated through 180°. In particular it is unclear how such rotation might be accomplished from a remote site or automatically to coincide with the changing of the time. Accordingly, the back to back impellers that form part of the presently described embodiment of the invention are advantageous where bi directional fluid flows, such as tidal flows are encountered.

Figure 6:
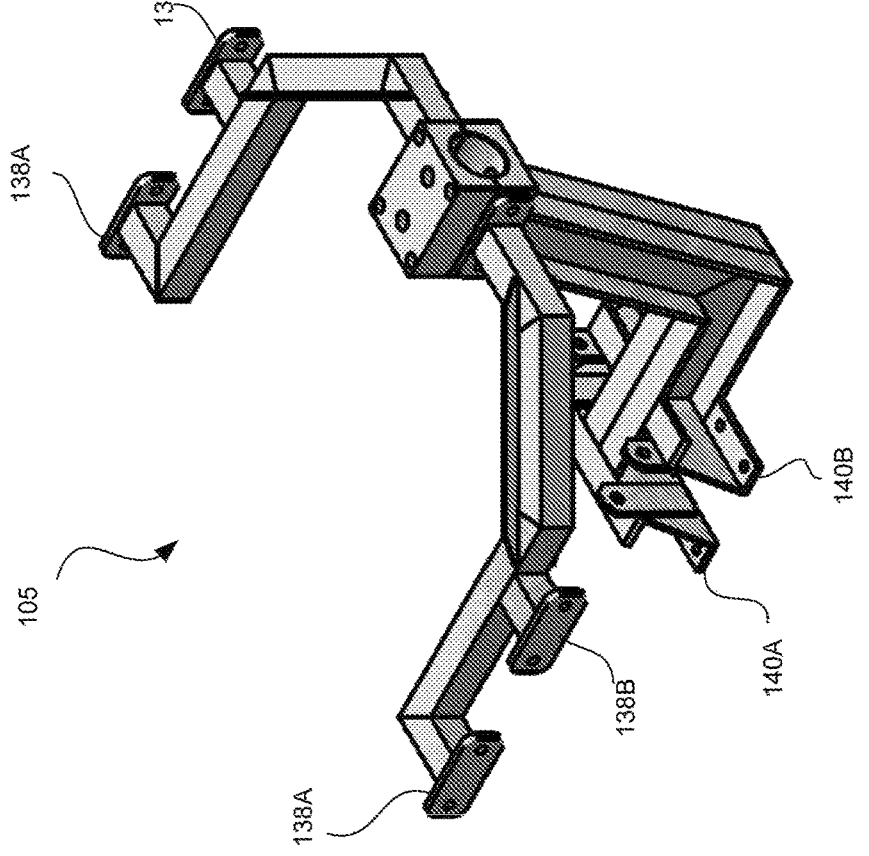
FIG. 6 is a partially exploded view of an impeller frame of the turbine and electrical generator assembly.

Each of the frames 12A, 12B is identical and an exemplary frame 12 is illustrated in FIG. 6. The frame 12 is comprised of a ring 130 with four equispaced spokes extending radially inward from the ring to a central hub 134. The hub 134 is formed with opposed coaxial openings for journaling respective end 158A, 158B (best seen in FIG. 8) of a spindle 156 of the drive wheel 154.

As may be seen in FIG. 6, opposed first and second mounting members 136 and 137 diverge, upwardly and outwardly, from the ring 130 of frame 12. Remote ends of the mounting members 136 and 137 are fastened to the mounting frame 105 by respective pairs of upper mounting plates 138A and 138B. The mounting frame 105 further includes lower mounting plates 140A and 140B which respectively are fastened to ring mounting plates 150A and 150B of each of the respective mounting frames 12A and 12B.

Pyramidal shaped spiders 125A and 125B extend laterally from rings 130A, 130B of each frame 12A, and 12B. Each of the spiders is comprised of 4 elongate members 128 which converge outwardly to a collar 13 that is formed with a recess for receiving a leading end 165 of an axle 163 of impeller 152.

Figure 8:
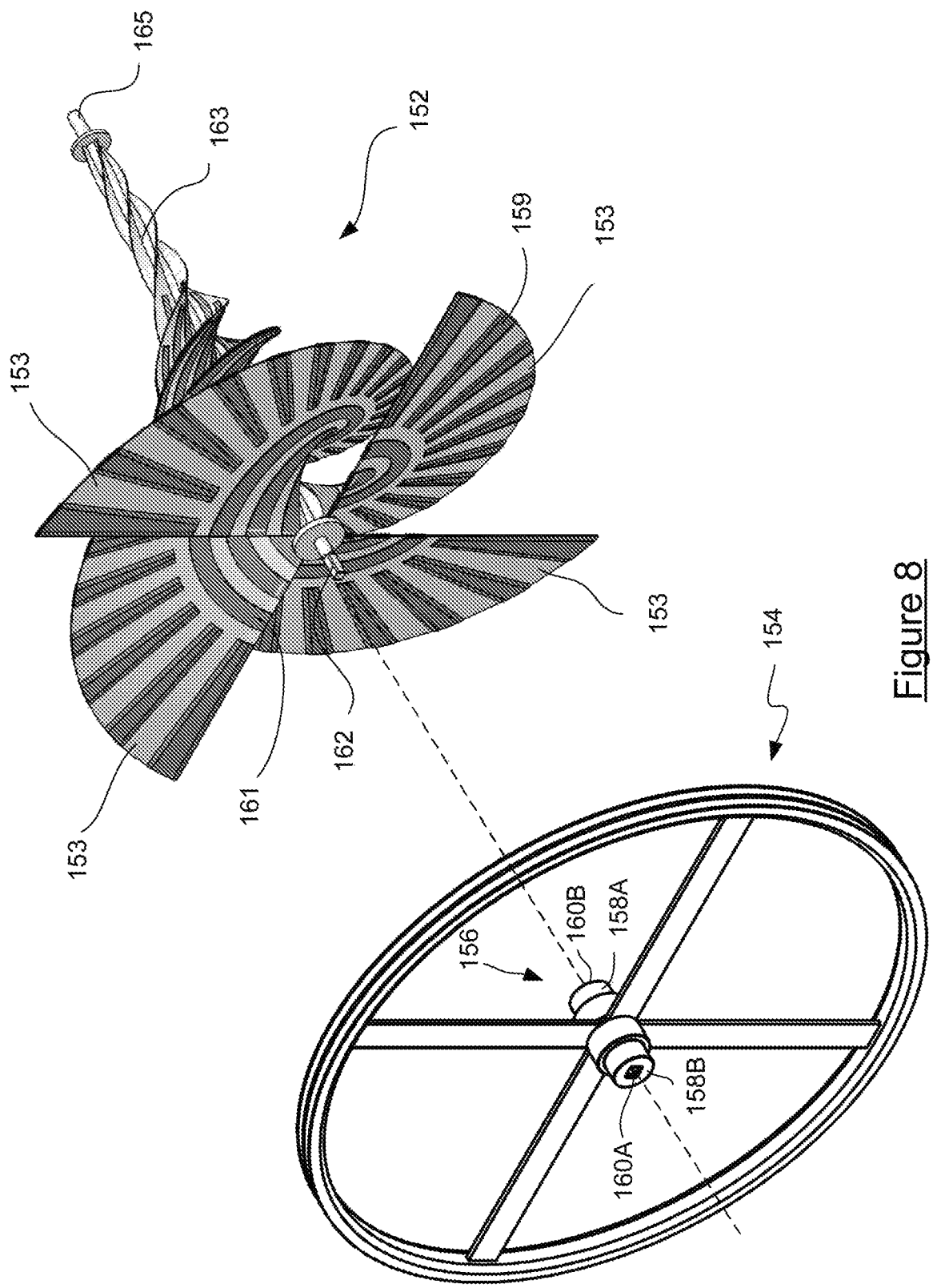
FIG. 8 is a view of a drive wheel and impeller of the turbine and electrical generator assembly.

Referring to FIG. 8, each of the ends 158B and 158A of the spindle 156 of the drive wheel 154 is formed with a square section bore 160A, 160B, which respectively receives a square section proximal end 162A 162B of the axles 163A, 163B of each of the impellers 152A and 152B. Accordingly it will be realised that the drive wheel 154 and each of the back-to-back impellers 152A and 152B are rotationally fast with each other. Consequently fluid flow across either one of the impellers will cause both impellers and the drive wheel 1542 all rotate as one.

The periphery of the drive wheel 154 is formed with a pair of V-shaped grooves for receiving V-profile drive belts 166A and 166B. As may be seen from FIG. 4, drive belts 166A and 166B are looped over the drive wheel 154 and over generator pulley 21. Accordingly rotation of the drive wheel 154 causes the belts 166A and 166B to rotate sheave 21 and thus via clutch 27 the generator rotor 10 to thereby cause the generator 25 to generate electrical current.

With reference to FIGS. 9 and 10, a tensioning assembly 170 is provided which is mounted to turbine housing frames 12B and 12B. The tensioning assembly 170 includes a roller 172 that is biased by a spring (not shown) to exert tensioning pressure against each of the belts 166A and 166B to thereby reduce slipping between the belts and the drive wheel 154 and the generator pulley 21.

The preferred impeller 152, which is best seen in FIG. 8 comprises four separate conical, helical blades 153 that are rotationally offset at 90 degrees to each other about central axle 163. Each blade 153 has a smaller blade radius adjacent the leading end 165 of the axle 163 and a larger blade radius adjacent the trailing end 162 of the axle 163. The decreasing radius of each of the blades towards the leading end 165 is believed to be helpful in improving the efficiency of power extraction from the fluid flow, for instance by minimising turbulence between the spaced apart blade portions. Each of the blades 153 are formed with spiral ribs 159 and radial ribs 161. The ribs 159 and 161 are thought to improve the efficiency of the impeller in converting fluid flow along the impeller into mechanical rotation about the axle 163.

The four blades, offset by 90 degrees to each other, cooperate to assist in capturing as much energy as possible from the water that flows through the turbine in use.

In use the floating hydrokinetic generator 100 is towed to a suitable tidal area and either anchored in place or secured to a structure such as a wharf 91 as shown in FIG. 1.

The flow of water through tunnel 108 in the direction indicated by arrow 98 will cause the impeller 152A to rotate in the counter clockwise direction indicated by arrow 94 in FIG. 1. The rotation of the impeller 152A will in turn cause the drive wheel 154 to rotate counter clockwise and thereby cause counter clockwise rotation of the sheave 21 which is conveyed to the rotor 10 of the generator 25 via the electric clutch 27 so that the generator produces electric current.

Electrical cables from the generator 10 convey the produced electricity from the hydrokinetic generator 100 for use at another location.

In the event that the flow of water through the tunnel 108 proceeds in the opposite direction, indicated by arrow 96 then that flow will impact on the leading end of the second impeller 152B and thereby cause it to rotate. The rotation of the impeller 152B will in turn cause the drive wheel 154 to rotate clockwise and thereby cause clockwise rotation of the sheave 21, which is conveyed to the rotor of the generator 25 via the electric clutch 27 so that the generator produces electric current. It will be realised that where a direct current generator is used the polarity of the output of the generator will reverse with the reversal in direction of fluid flow through the tunnel. Therefore it may be preferable to incorporate suitable rectification or inversion circuitry depending on the intended use of the generated electricity.

Although the embodiment of the invention that has been described is useful the Inventor has found that a high degree of through-flow is required in order to start the turbine rotating. It is thought that the reason for this is the belt coupling between the impellers and the electrical generator which has to be quite tight in order to avoid slippage. Consequently, the Inventor has devised a further and preferred embodiment of the invention which will now be described.

Figure 11:
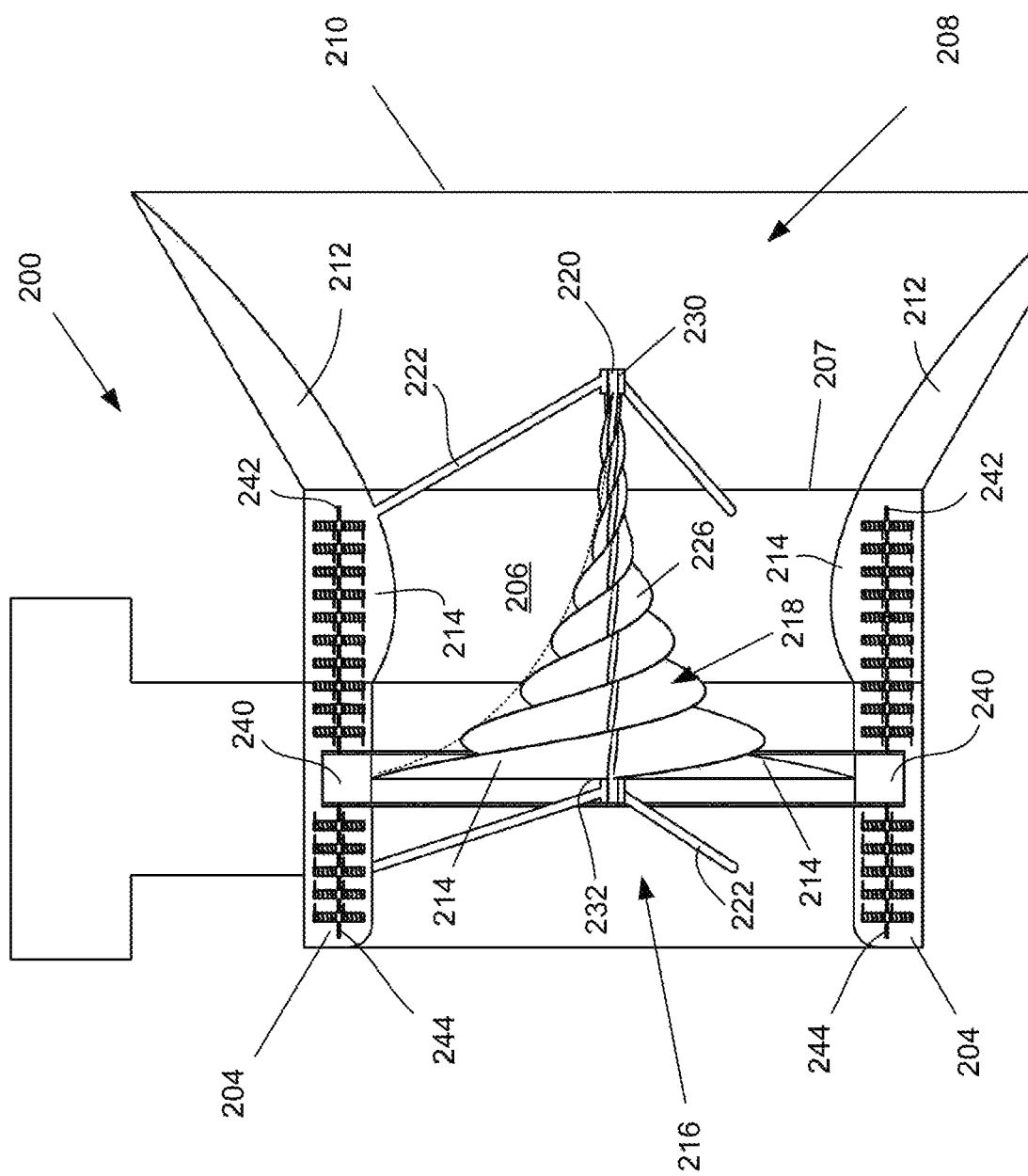
FIG. 11 is a sagittal cross sectional view through the hydrokinetic generator of FIGS. 10A and 10B.

With reference to FIGS. 10A to 11, there is shown a hydrokinetic generator 200 including a submersible housing 202. The housing if formed with a cylindrical wall 204 that defines a conduit 206 therethrough for the flow of a fluid, which is typically water. A leading side 207 of the cylindrical wall 204 is continuous with an intake shroud 208. The intake shroud 208 has a truncated conical form with a wide leading intake side 210 that converges toward, and is continuous with, the leading side 207 of the conduit 206. A portion 212 of the internal side wall of the shroud 208 and a leading portion 214 of the side wall 204 of the conduit bow inward in order to increase the velocity of fluid as it progresses from the intake side 210 of the shroud 208 through the conduit 206.

A turbine 216 is mounted to the housing within the conduit 206. The turbine 216 comprises at least one impeller 218 which is located in the conduit 206. The impeller 218 is formed with an axle 220 and is held in place by supports 222 which extend from the side wall 204 to opposite ends of the axle 220 and which are journaled thereto. The impeller 218 comprises a plurality of spiral, helical blades 214 which are disposed about the axle. In side profile as shown in FIG. 11, the outer edges of the blades 214 increase in diameter somewhat exponentially with distance from the leading end 230 to the trailing end 232 of the impeller 218 as indicated by dashed line 226. The Inventor has found that the shape of the impeller 218 is particularly advantageous for the efficient conversion of energy from fluid flowing through the conduit into rotational energy of the impeller.

Figure 12:
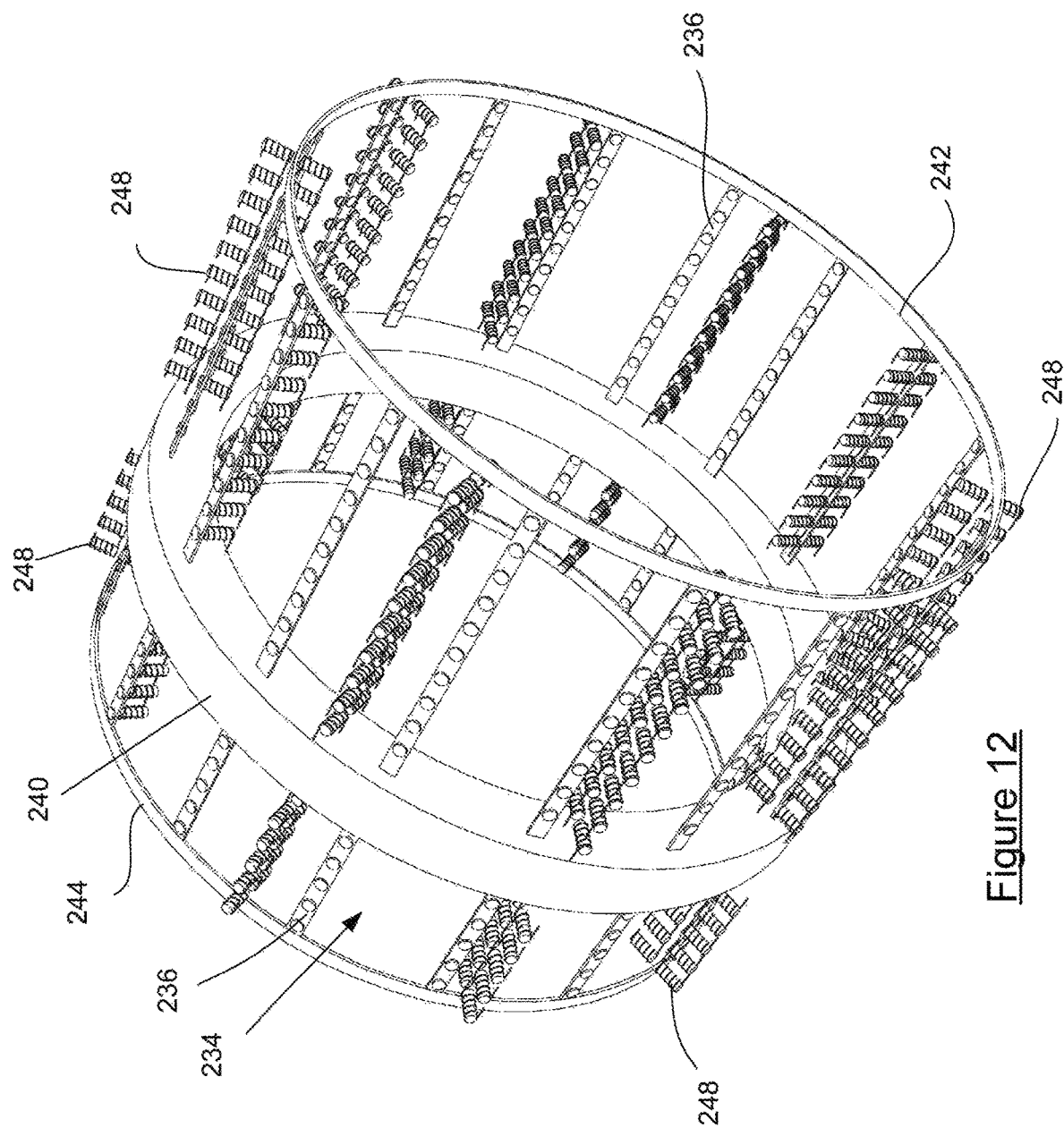
FIG. 12 is a view of an electrical generator assembly of the hydrokinetic generator of FIGS. 10A to 11.

FIG. 12 depicts an electrical generator 234 of the hydrokinetic generator 200, which is coupled to the at least one turbine 216 for converting rotational mechanical energy from turbine 216 to electrical energy as will now be explained.

The generator includes a plurality of elongate members 236 which each bear one or more magnetic regions in the form of disk magnets 238 positioned along their length.

Figure 13:
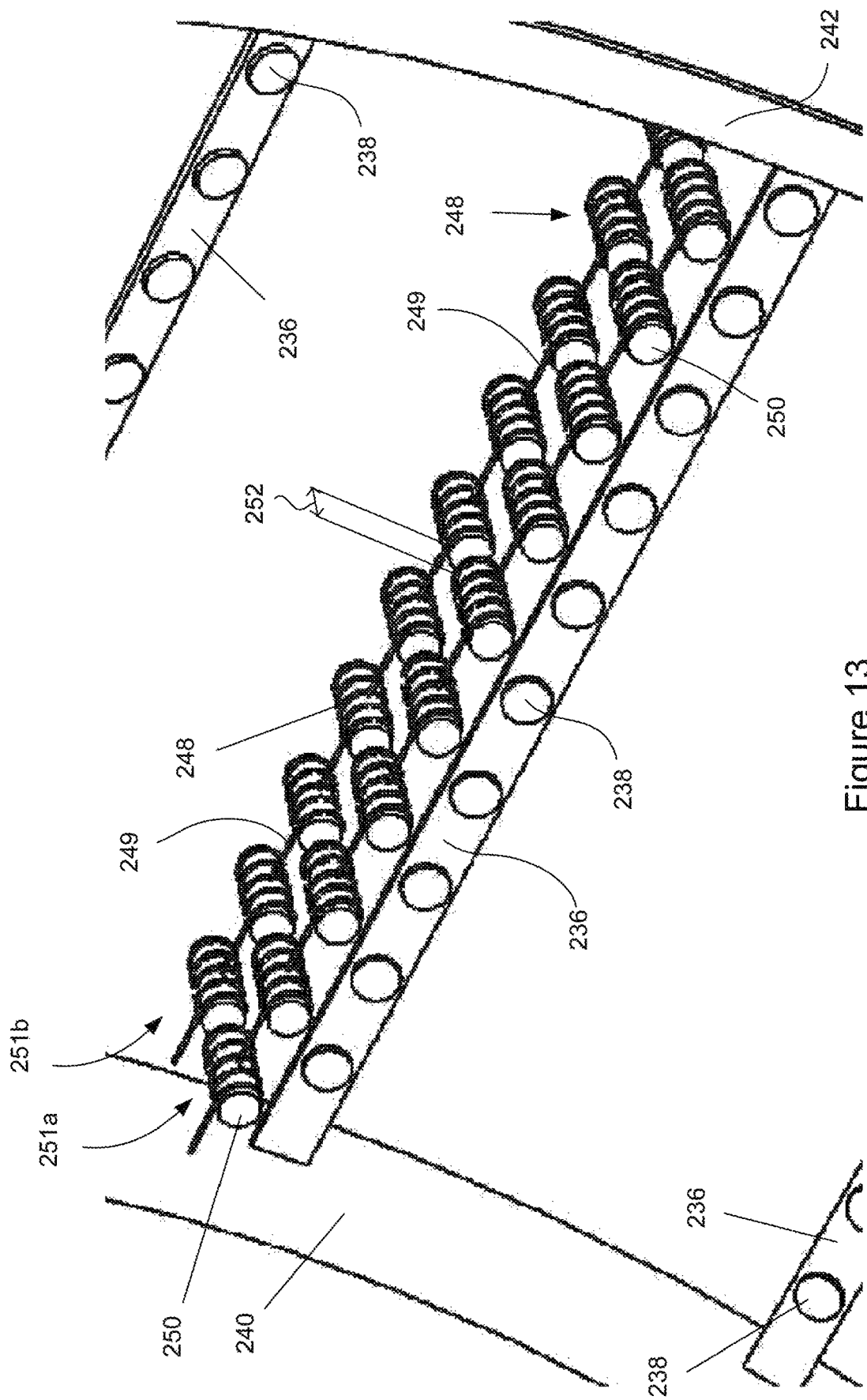
FIG. 13 is a detail of a portion of FIG. 12.
Figure 15:
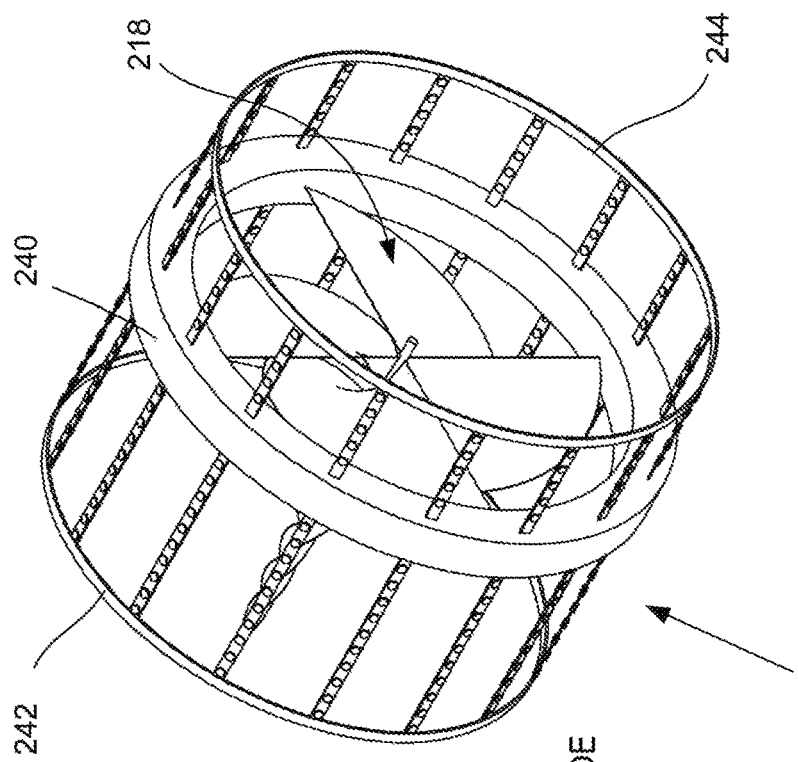
FIG. 15 is an isometric view of the trailing end of the impeller and electrical generator cage.
Figure 14:
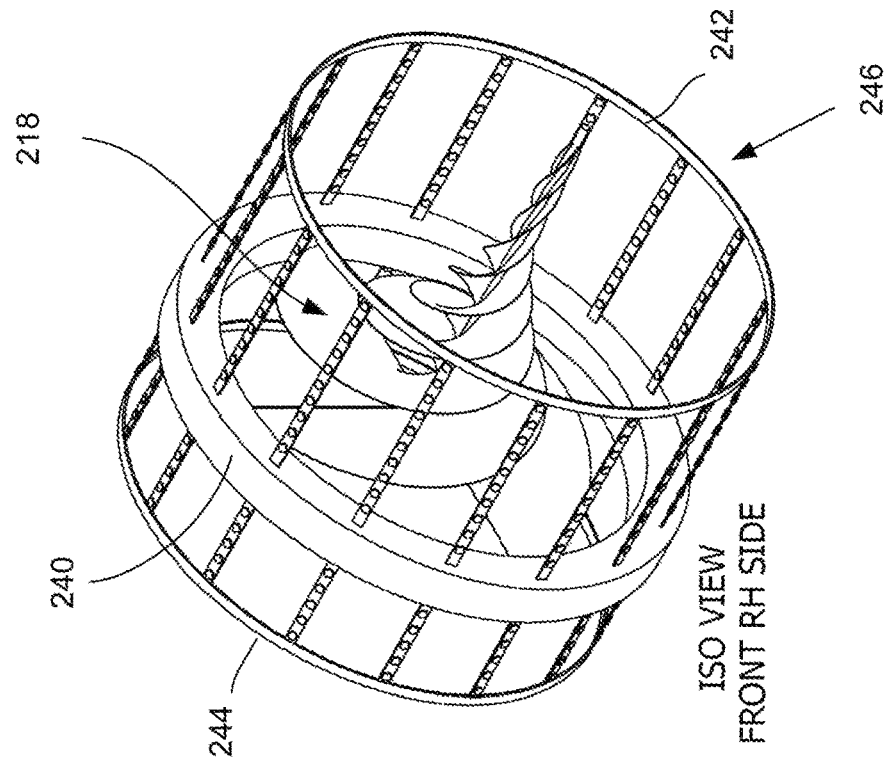
FIG. 14 is an isometric view of the leading end of the impeller and electrical generator cage.

The generator 234 includes an impeller ring 240 that locates about the outermost tips of the impeller 218 as shown in FIGS. 13 and 14 and which is fastened thereto so that the impeller ring 240 and the impeller 218 are coaxial and fixed relative to each other.

The elongate members 236 bearing the disk magnets 238 extend outwardly from the impeller ring parallel with the axis of the impeller 218.

In order to enhance structural integrity of the generator, a leading ring 242 and a trailing ring 244 are provided, each being coaxial with the impeller ring 240. Leading tips of the elongate members 236 are fastened to the leading ring 242 and trailing tips of the elongate members 236 are fastened to the trailing ring 244.

The elongate members 236 are disposed about the at least one impeller so that they effectively comprise bars which, together with the impeller ring and the leading and trailing rings, form a cylindrical cage 246, identified in FIGS. 13 and 14, that is fast with the impeller 218. The impeller 218, with the cylindrical cage 246 are free to rotate relative to the housing. Neither the elongate members nor the various rings are made of electrically conductive material in the preferred embodiment of the invention.

Referring again to FIGS. 12 and 13, in addition to the cage 246 the generator 234 is also comprised of a number of windings 248 which, as will be discussed further shortly, are held in the wall of the housing that defines the fluid conduit and which are arranged for electromagnetic interaction with the disk magnets 238. Consequently, rotation of the impeller 218 moves the magnetic regions, i.e. the disk magnets 238 past the windings 248 so that conductors 249 of each of the windings cut through magnetic flux associated with the magnets 238 to thereby induce an electrical current in the windings. The windings each have a ferromagnetic core such as an iron core 250. The windings may be connected in parallel or series, or in parallel and series groups depending on required output voltage for the generator. As shown in FIG. 13, in the presently described preferred embodiment of the invention the windings are arranged in groups of two opposed rows of windings 251a, 251b with each group extending parallel to the axes of the impeller ring and the leading and trailing ring. A sufficient gap 252 is provided between the ends of windings of the opposed rows for the elongate members 236 and disk magnets 238 to pass therethrough.

Figure 16:
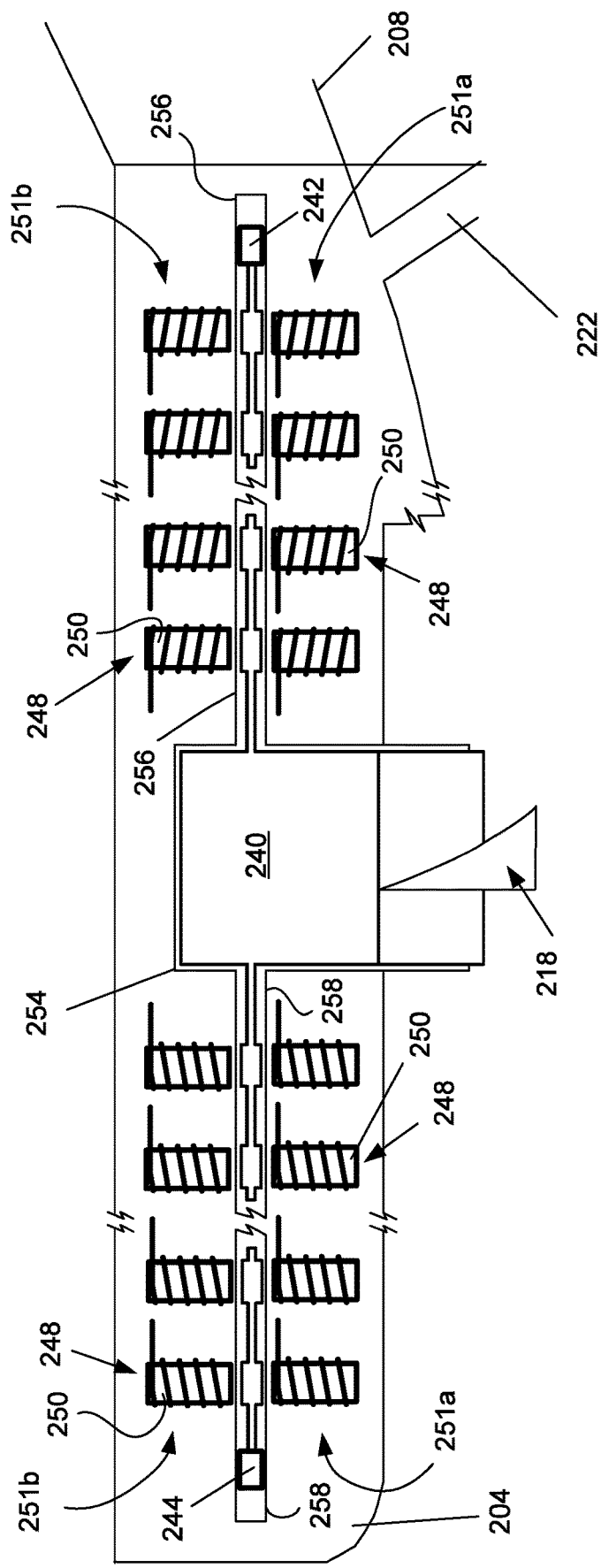
FIG. 16 is a detail of a portion of FIG. 11.
Figure 17:
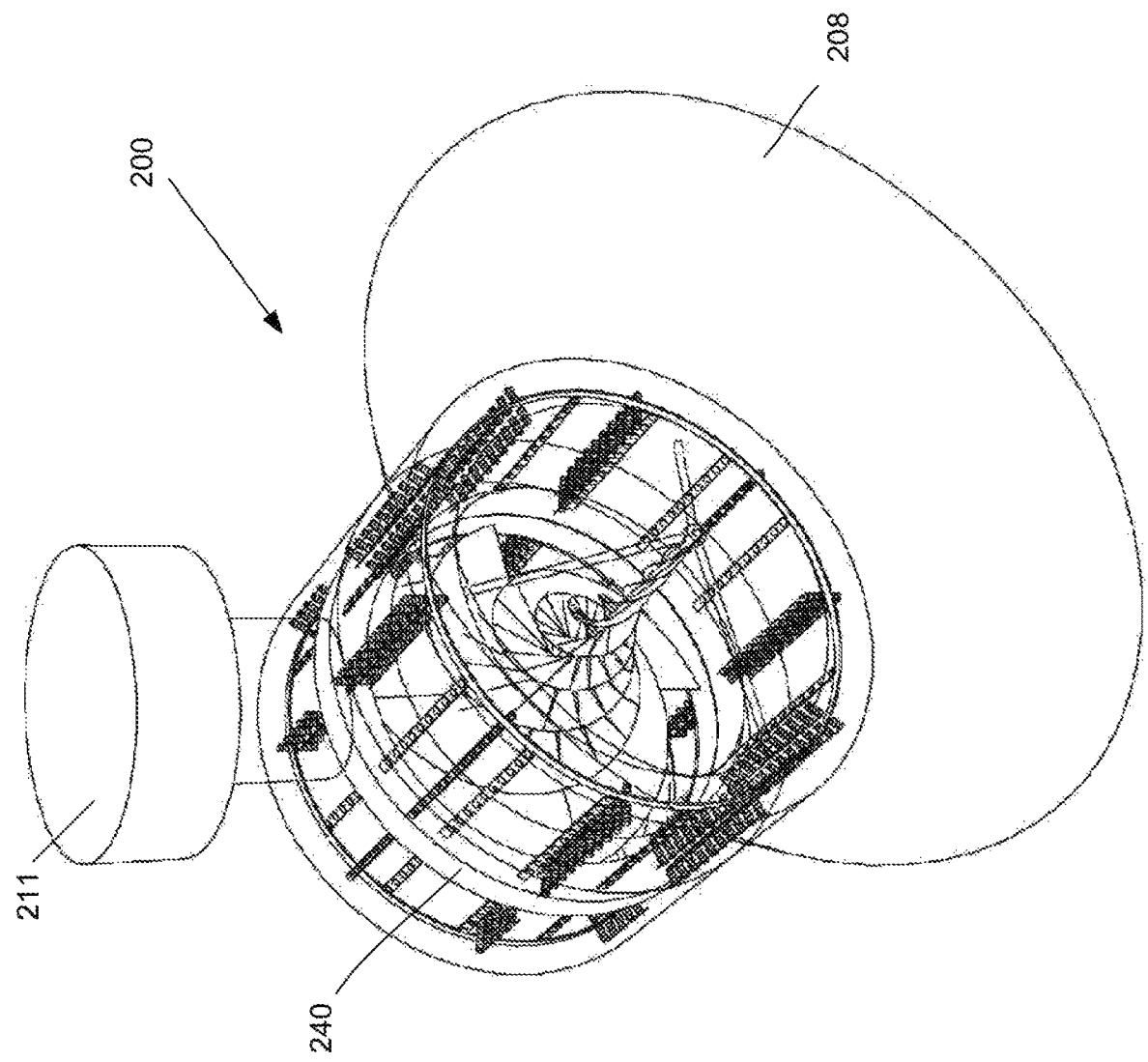
FIG. 17 is a view of hydrokinetic generator of FIG. 10A with walls of the housing omitted to reveal the electrical generator and impeller.

FIG. 16 is a detail of a cross section through a portion of conduit wall 204. It will be observed that the wall 204 is formed with an annular recess 254 that receives a periphery of the impeller ring 240.

Leading and trailing cylindrical openings 256, 258 are formed in the wall 204 and are continuous with the annular recess 254 and extend laterally therefrom. The leading and trailing cylindrical openings 246, 258 accommodate the elongate members 236, disk magnets 238 and also the leading ring 242 and trailing ring 244.

It will be observed that the windings 248 are located within the wall on opposed sides of the leading and trailing cylindrical openings. The wall is preferably made of a durable synthetic material such as blown plastic or fiberglass.

Consequently the windings 248, including the iron cores 250 are sealed within material of the wall in order that they are removed from contact with fluid flowing through the conduit in use.

Cables connected to the windings are impregnated within the wall of the housing and extend therethrough to a connection terminal for take off of electrical power produced by the generator 200 in use.

Figure 18:
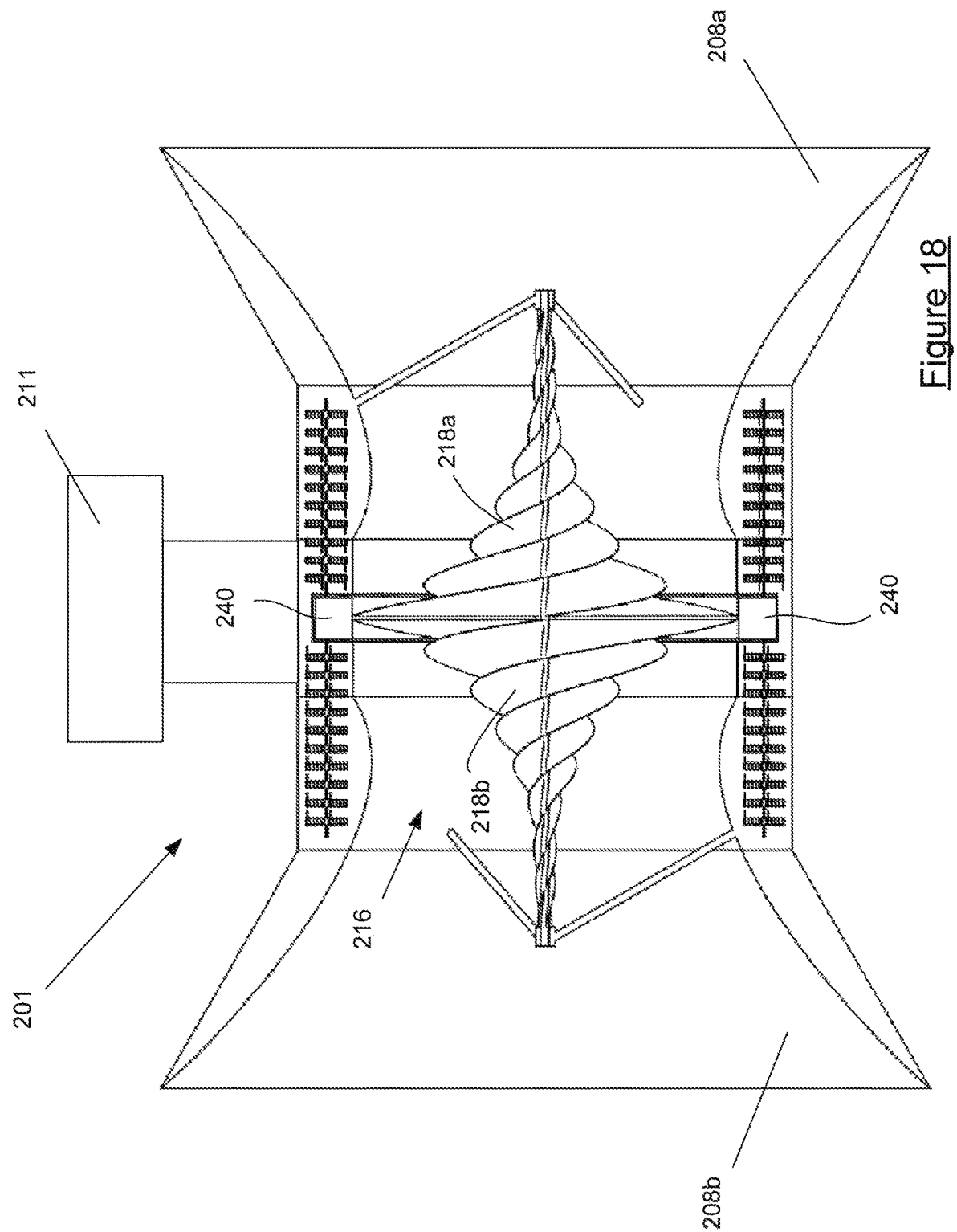
FIG. 18 is a view of a bidirectional hydrokinetic generator according to a further embodiment of the present invention.
Figure 19:
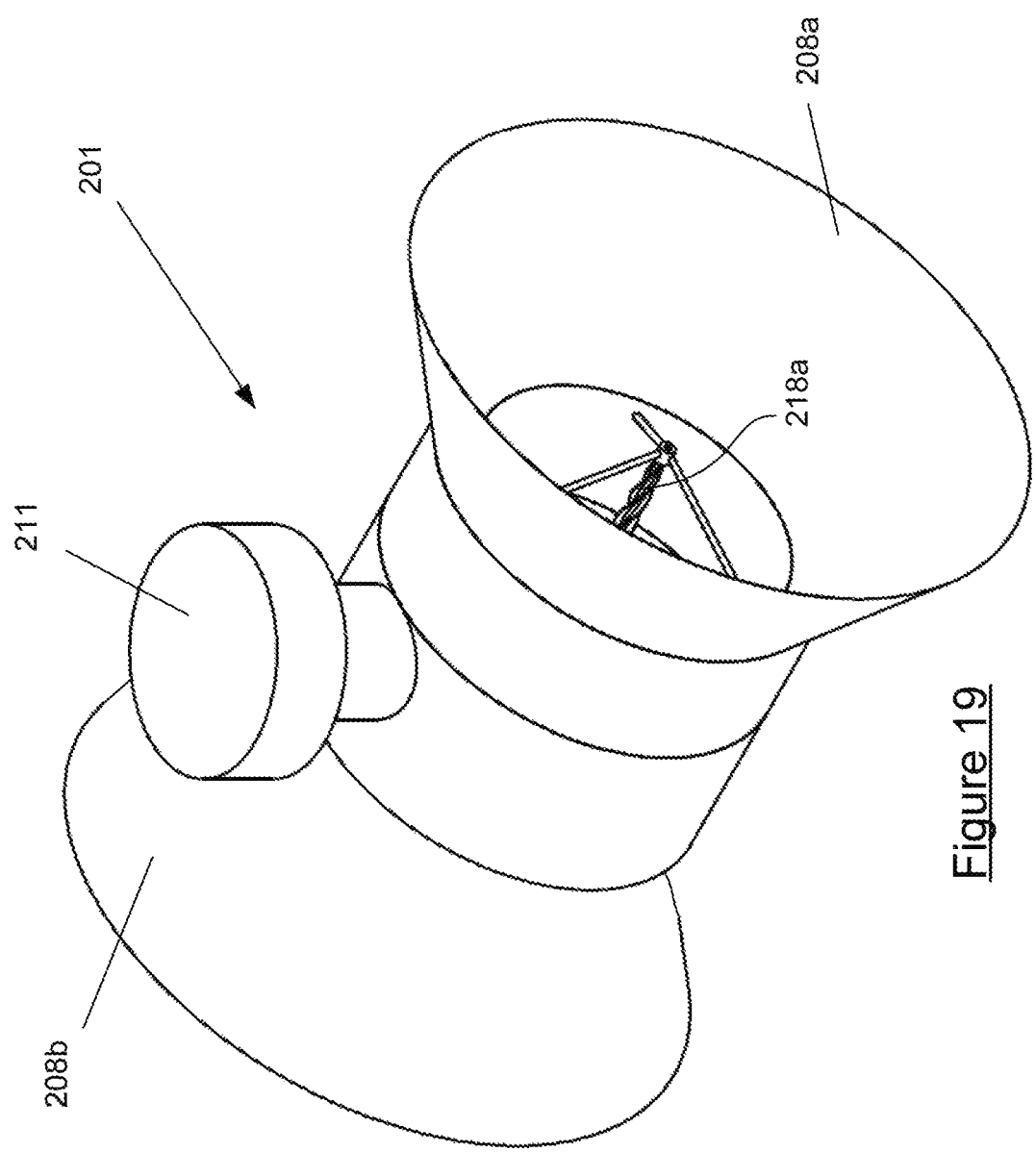
FIG. 19 is an isometric view of the exterior of the bidirectional hydrokinetic generator of FIG. 18.
Figure 20:
FIG. 20 is a view of the bidirectional impeller of the bidirectional hydrokinetic generator of FIGS. 18 and 19.

Referring now to FIGS. 18 and 19 a bidirectional hydrokinetic generator 201 according to a further embodiment of the invention is shown. Hydrokinetic generator 201 is constructed analogously to previously described hydrokinetic generator 200 except that it includes first and second shrouds 208a and 208b and has a turbine 216 that comprises first and second impellers 218a, 218b (shown in detail in FIG. 20) each having a leading end and a trailing end, the impellers being mounted coaxially with trailing ends adjacent to each other for accommodating bidirectional flows through the conduit 206. The electrical generator of the bidirectional hydrokinetic generator 201 is entirely similar to that of electrical generator 234 of FIG. 12.

Figure 21:
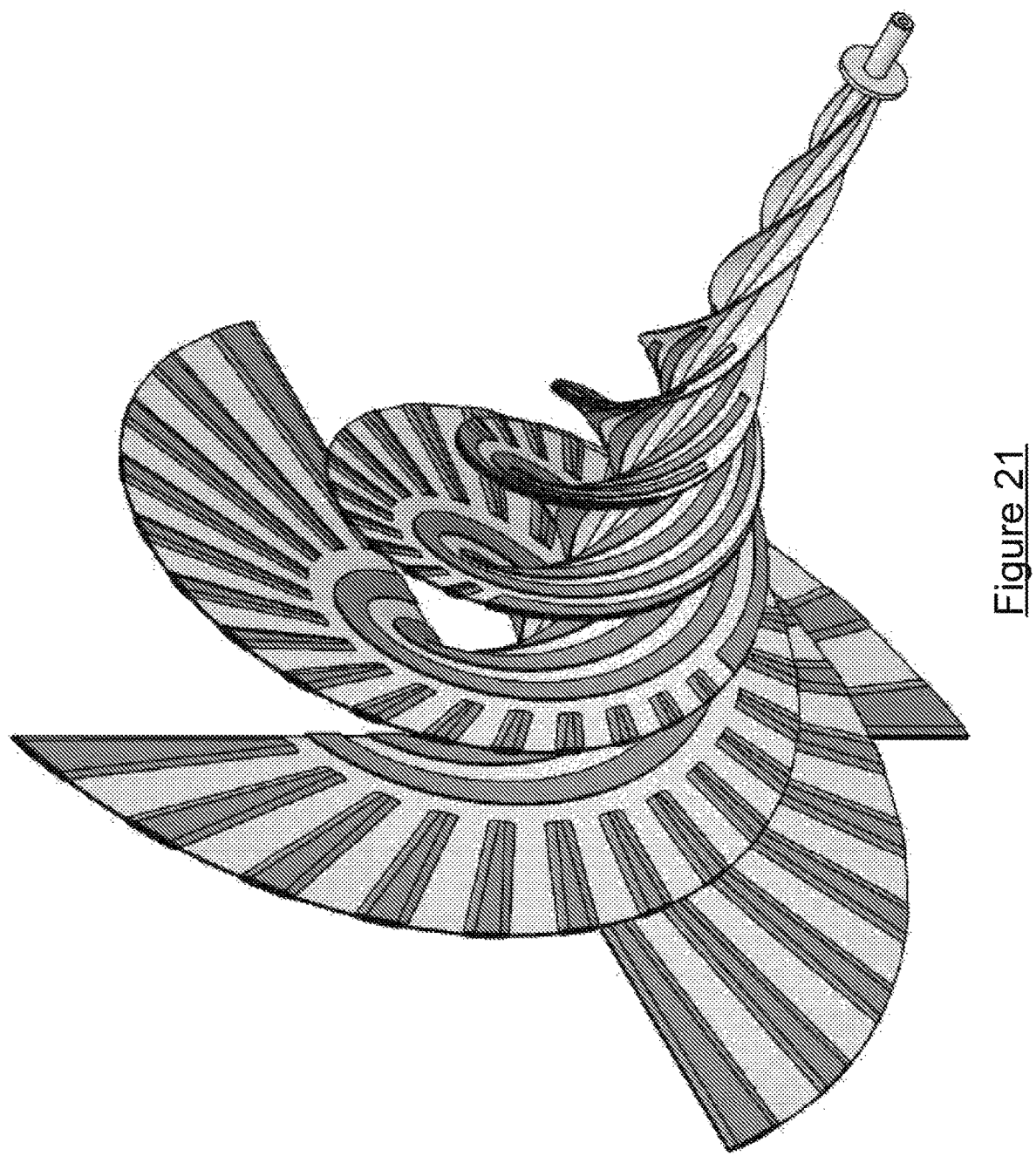
FIG. 21 is a view of an impeller that may be used in hydrokinetic generators according to the present invention, having four blades, each blade having a helical, spiral form.
Figure 23:
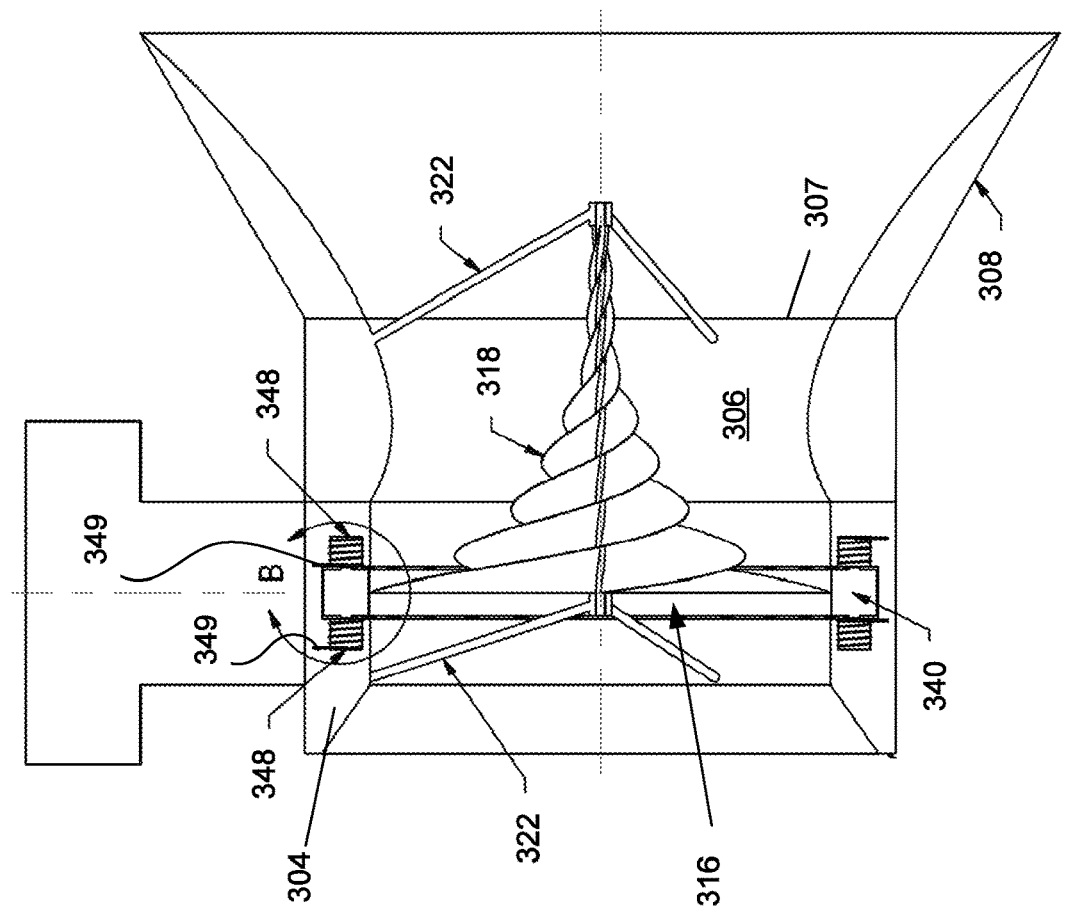
FIG. 23 is a sagittal cross section through the embodiment of FIG. 22.
Figure 22:
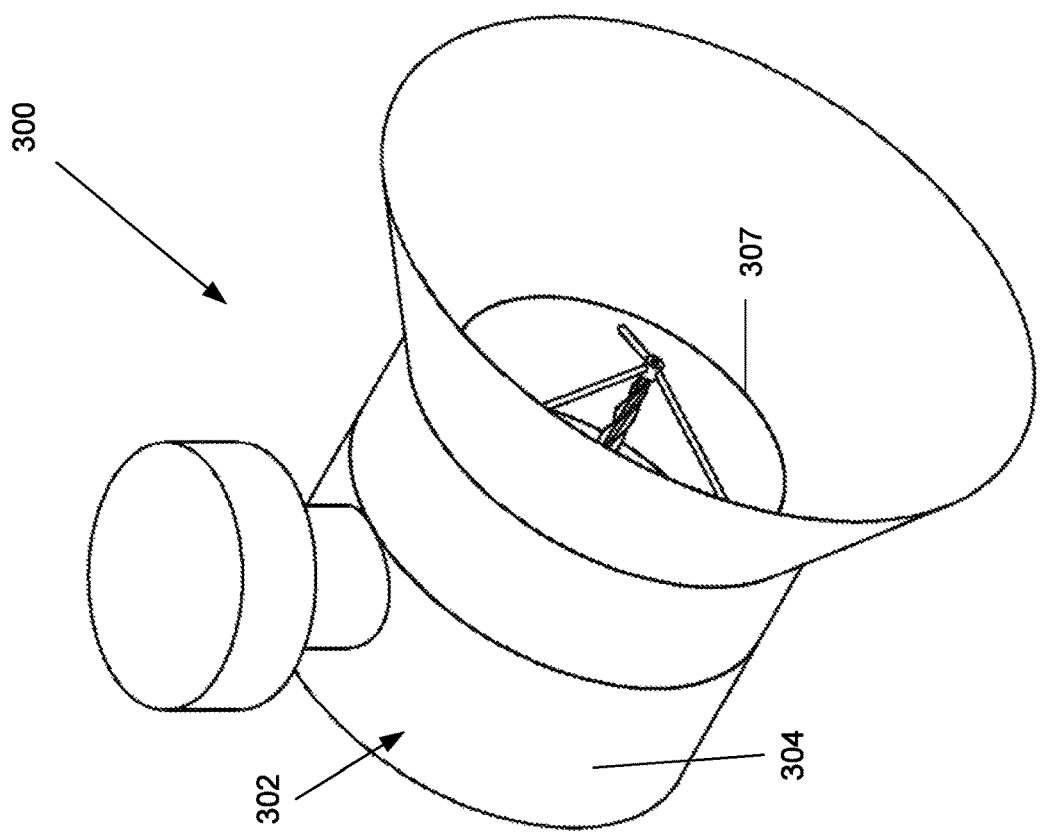
FIG. 22 is an isometric view of a generator according to a further embodiment of the invention.

As shown in FIG. 21, ribs or other protrusions may be disposed over the blades of each impeller to assist in capturing energy from fluid flowing across the impeller in use.

The ribs may comprise one or more radial ribs and one or more spiral ribs as illustrated in FIG. 21.

Alternatively, the blades may have a roughened surface. For example they can be made rough by spraying them with a fast set, rapid curing polyuria such as "Xtreme Polyurea AX 3500 Pure Polyurea Industrial" which is available through the following website: https://www.xtreme-coatings.com.au/index.php/industrial/on-site-coatings (retrieved 8 Dec. 2017).

In use either the unidirectional hydrokinetic generator 200, or the bidirectional version 201, are mounted beneath a suitable pontoon or jetty by means of yaw adjust mount 211. The yaw adjust mount includes a pivot so that the housing of the hydrokinetic generator can be swung to best bring the conduit through the housing into alignment with the surrounding water flow. As water flows through the shroud and into the conduit it increases in velocity due to the narrowing of the shroud and causes the impeller to rotate. As the impeller rotates it in turn brings the cage, which is fastened to the outer tips of the impeller by means of the impeller ring, to also rotate. Accordingly, the bars of the cage and with them the disk magnets pass between the opposed windings and so induce an electrical current in the windings. The electrical current is brought out by suitable cabling to a connection box for wiring to an electrical distribution network or for charging of batteries or other usage at site.

FIGS. 22 to 25 illustrate a hydrokinetic generator 300 according to further embodiment of the invention. The hydrokinetic generator 300 includes a submersible housing 302. The housing is formed with a cylindrical wall 304 that defines a conduit 306 therethrough for the flow of a fluid, which is typically water. A leading side 307 of the cylindrical wall 304 is continuous with an intake shroud 308. The intake shroud 308 has a truncated conical form with a wide leading intake side that converges toward, and is continuous with, the leading side 307 of the conduit 306.

A turbine 316 is mounted to the housing within the conduit 306 in the same fashion as similarly described for the hydrokinetic generators 200 and 201. The turbine 316 comprises at least one impeller 318 which is located in the conduit 306. The impeller 318 is formed with an axle and is held in place by supports 322 which extend from the side wall 304 to opposite ends of the axle and which are journaled thereto as previously described for generators 200 and 201. The impeller 318 is entirely similar to impeller 218 as previously discussed.

Figure 24B:
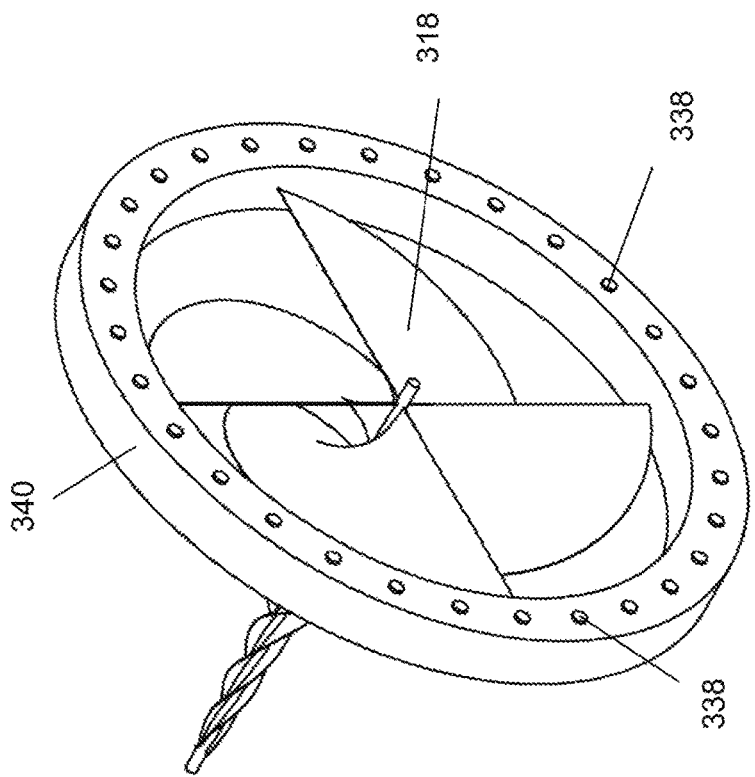
FIGS. 24A and 24B are forward and rear isometric views of the impeller and impeller ring with peripheral magnetic regions in the form of disk magnets of the embodiment of FIG. 22.
Figure 24A:
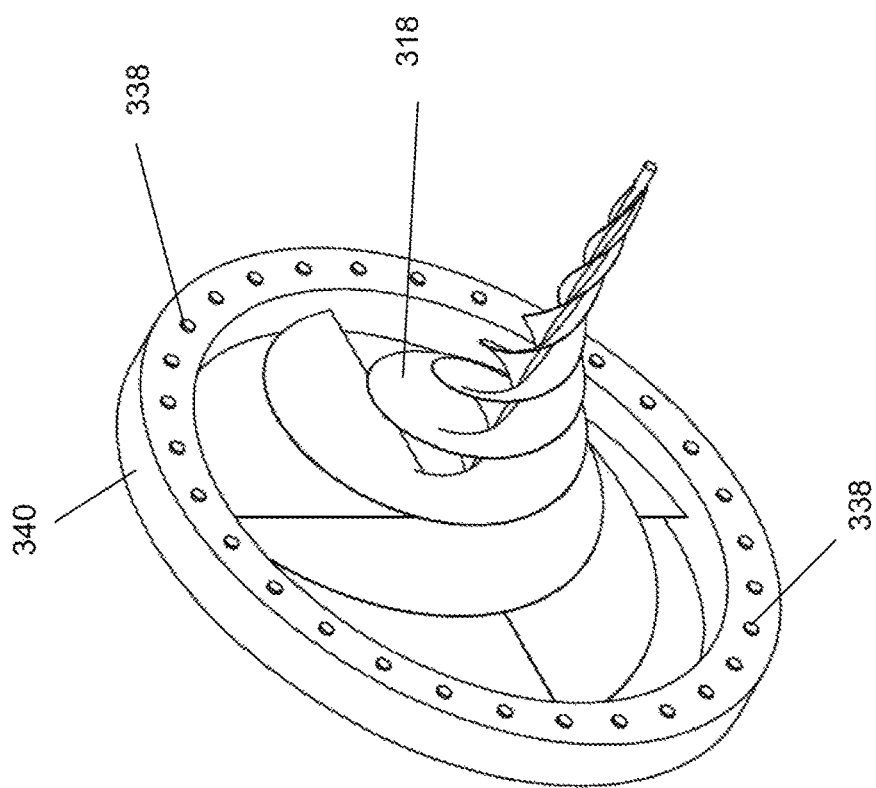
Figure 25:
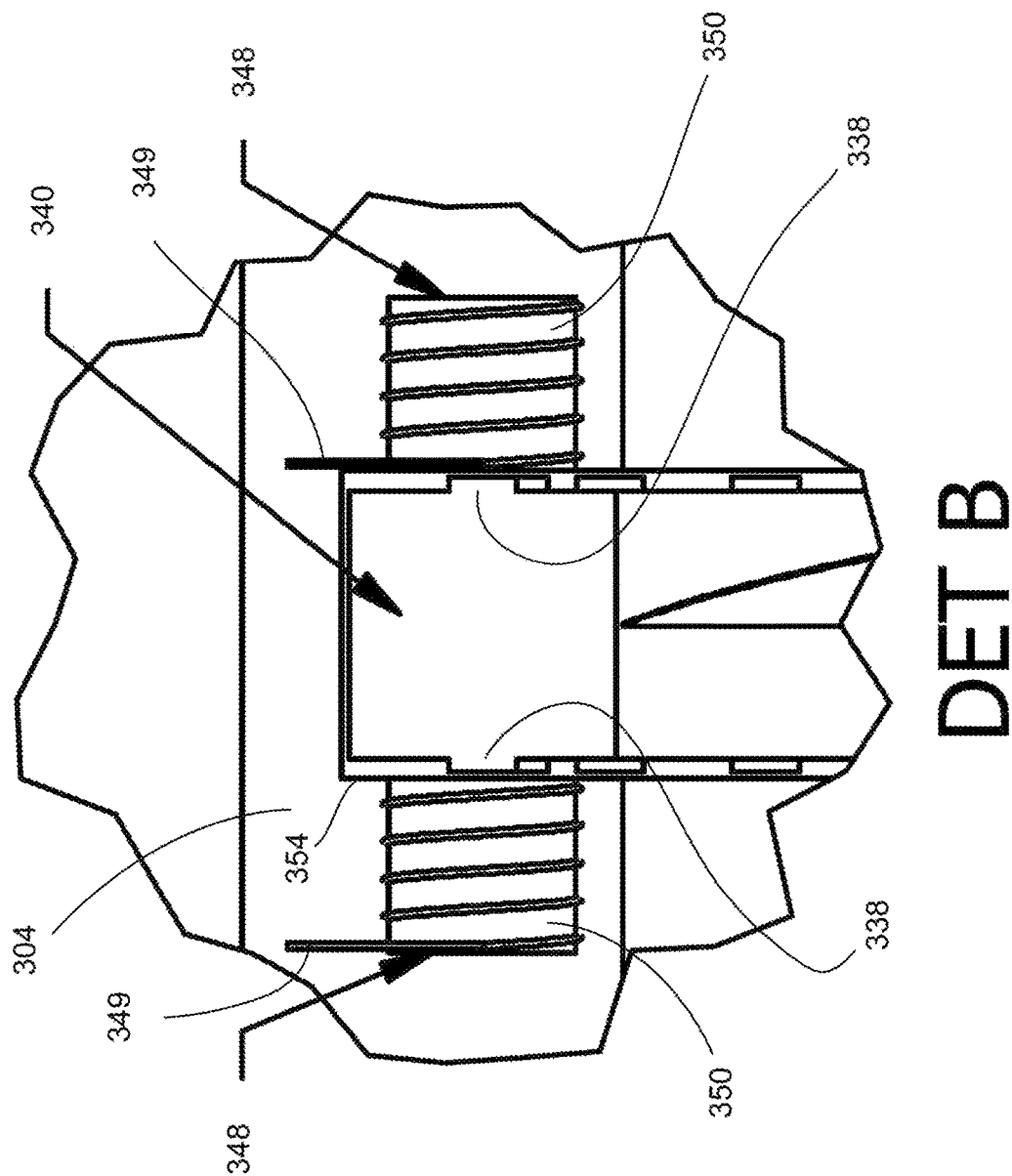
FIG. 25 is a detail view of FIG. 23.

Hydrokinetic generator 300 includes an electrical generator that includes an impeller ring 340 that locates about the outermost tips of the impeller 318 as seen in the forward and reverse views of FIGS. 24 and 25 and which is fastened thereto so that the impeller ring 340 and the impeller 318 are coaxial and fixed relative to each other.

Magnets 338 are located on either side of the impeller ring 340 and point parallel to the axle of the impeller 381.

The electrical generator 334 is also comprised of a number of windings 348 which are held in the wall of the housing that defines the fluid conduit and which are arranged for electromagnetic interaction with the magnets 338 of the impeller ring. FIG. 25 is a detail of a cross section through a portion of conduit wall 304. It will be observed that the wall 304 is formed with an annular recess 354 that receives a periphery of the impeller ring 340. Two opposed polar arrays of windings 351a, 351b are arranged in the wall adjacent opposite sides of the annular recess 354.

Figure 27:
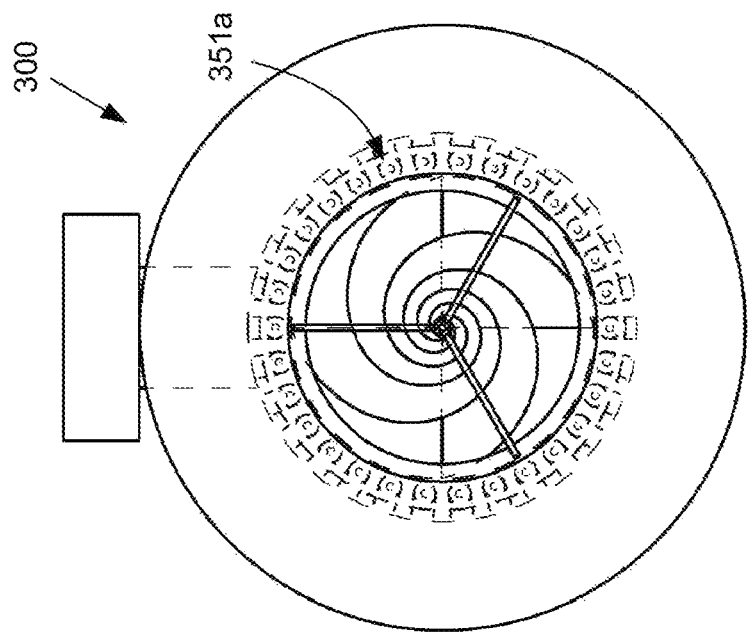
FIG. 27 is a front plan view corresponding to FIG. 26.
Figure 26:
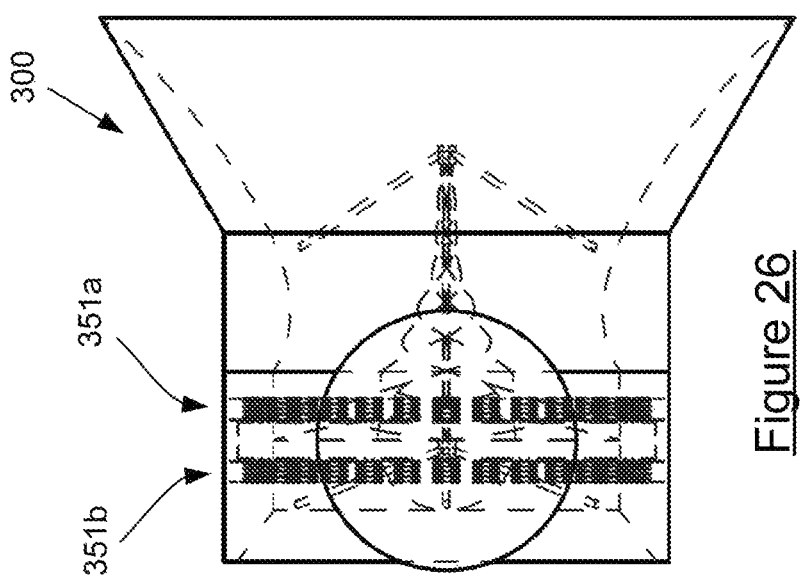
FIG. 26 is a top plan view of the embodiment of FIG. 22 revealing the internal windings.

Consequently, rotation of the impeller 318 rotates the impeller ring 340 and thus moves the magnetic regions, i.e. the magnets 338 past the windings 348 so that conductors 349 of each of the windings cut through magnetic flux associated with the magnets 338 to thereby induce an electrical current in the windings. The windings each have a ferromagnetic core such as an iron core 350. The windings may be connected in parallel or series, or in parallel and series groups depending on required output voltage for the generator. As mentioned previously and best seen in FIGS. 26 and 27, the windings 348 are arranged in two opposed polar arrays of windings 351a, 351b with the cores of the windings of each polar array extending parallel to the axes of the impeller ring and impeller.

It will be observed that the windings 348 are located within the wall on opposed sides of the annular recess 354 that is formed in the wall 304. The wall 304 is preferably made of a durable synthetic material such as blown plastic or fiberglass.

Consequently the windings 348, including the iron cores 350 are sealed within material of the wall in order that they are removed from contact with fluid flowing through the conduit in use.

Cables connected to the windings are impregnated within the wall of the housing and extend therethrough to a connection terminal for take off of electrical power produced by the generator 300 in use.

The hydrokinetic generator 300 is used analogously to previously described generator 200 for example.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

I claim:

1. A hydrokinetic generator including: a submersible housing defining a conduit therethrough for the flow of a fluid; a turbine mounted to the housing comprising at least one impeller for a hydrokinetic turbine comprising a plurality of spiral, helical blades disposed about a common axle from a leading end thereof to a trailing end wherein the blades' radii increases from the leading end to the trailing end, located in the conduit for rotation by said flow; an impeller ring is disposed about outermost tips of the impeller and fastened thereto wherein the impeller ring and the impeller are coaxial; at least one electrical generator coupled to the turbine for converting mechanical energy from the turbine to electrical energy; a plurality of magnetic regions disposed about the at least one impeller and fast therewith, wherein the magnetic regions are disposed around a periphery of the impeller ring parallel to the axle of the impeller; and a number of windings arranged for electromagnetic interaction with said magnetic regions whereby in use rotation of the impeller moves the magnetic regions past the windings to thereby induce an electrical current in the windings, wherein each winding has a core, wherein a wall defining the conduit is formed with an annular recess for receiving the periphery of the impeller ring, and wherein the windings are located within the wall adjacent the annular recess and the core of each winding extends parallel to the axle of the impeller.

2. A hydrokinetic generator according to claim 1, wherein the blades' radii increases exponentially from the leading end to the trailing end.

3. A hydrokinetic generator according to claim 1, wherein ribs are disposed over the blades to assist in capturing energy from fluid flowing across the impeller in use.

4. A hydrokinetic generator according to claim 3, wherein the ribs comprise one or more radial ribs and one or more spiral ribs.

5. A hydrokinetic generator according to claim 1, wherein the surface of the blades is roughened to assist in capturing energy from fluid flowing across the impeller in use.

6. A hydrokinetic generator according to claim 1, wherein the turbine comprises first and second impellers each having a leading end and a trailing end, the impellers being mounted coaxially with trailing ends adjacent to each other for accommodating bidirectional flows through the conduit.

7. A hydrokinetic generator according to claim 1, wherein the windings are located on opposed sides of the annular recess.

8. A hydrokinetic generator according to claim 1, wherein the windings are sealed within material of the wall in order that they are isolated from contact with fluid flowing through the conduit in use.

9. A hydrokinetic generator according to claim 1, including cables connected to the windings and impregnated within the housing which extend therethrough to a connection terminal.

10. A hydrokinetic generator according to claim 1, wherein each of the windings has a ferromagnetic core.

11. A hydrokinetic generator according to claim 1, wherein each impeller is mounted to an impeller frame.

12. A hydrokinetic generator according to claim 1, wherein the housing forms part of a pontoon that is formed with a hull having the conduit therethrough in which the turbine is located.

13. A hydrokinetic generator including: a submersible housing defining a conduit therethrough for the flow of a fluid; a turbine mounted to the housing comprising at least one impeller located in the conduit for rotation by said flow; and at least one electrical generator coupled to the at least one turbine for converting mechanical energy from the turbine to electrical energy, the electrical generator including a ring about the impeller and fast therewith, the ring having one or more magnetic regions extending parallel to an axis of the impeller; and an annular recess formed in the housing and receiving a periphery of the ring; a number of windings located within material of the housing adjacent the annular recess for electromagnetic interaction with said magnetic regions whereby in use rotation of the impeller moves the magnetic regions past the windings to thereby induce an electrical current in the windings, wherein each winding has a core; wherein the core of each winding extends parallel to the axis of the impeller.

* * * * *